(12) United States Patent
Sakaguchi et al.

(10) Patent No.: US 11,173,600 B2
(45) Date of Patent: Nov. 16, 2021

(54) OPERATION DEVICE, CONTROL SYSTEM, CONTROL METHOD, AND NON-TRANSITORY COMPUTER-READABLE STORAGE MEDIUM

(71) Applicant: KABUSHIKI KAISHA YASKAWA DENKI, Kitakyushu (JP)

(72) Inventors: Seishiro Sakaguchi, Kitakyushu (JP); Kiyoshi Hirakawa, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 300 days.

(21) Appl. No.: 16/412,921

(22) Filed: May 15, 2019

(65) Prior Publication Data
US 2019/0351544 A1   Nov. 21, 2019

(30) Foreign Application Priority Data
May 16, 2018 (JP) .............................. JP2018-094623

(51) Int. Cl.
*B25J 9/00* (2006.01)
*B25J 9/16* (2006.01)
*B25J 13/06* (2006.01)

(52) U.S. Cl.
CPC ............. *B25J 9/161* (2013.01); *B25J 9/1694* (2013.01); *B25J 13/06* (2013.01)

(58) Field of Classification Search
CPC . B25J 9/161; B25J 9/1694; B25J 13/06; B25J 9/1689; B25J 9/0081; B25J 9/1656; B25J 13/00; G06F 3/0346; G05B 19/42
See application file for complete search history.

(56) References Cited

U.S. PATENT DOCUMENTS 7,386,365 B2 * 6/2008 Nixon ..................... A61B 34/37
700/245
8,442,661 B1 * 5/2013 Blackwell ............ G05D 1/0891
700/54
(Continued)

FOREIGN PATENT DOCUMENTS

JP       10-146782 A     6/1998
JP     2011-189431 A     9/2011
(Continued)

OTHER PUBLICATIONS

Extended European Search Report dated Dec. 11, 2019 in Patent Application No. 19166928.2, 9 pages.
(Continued)

*Primary Examiner* — Ian Jen
(74) *Attorney, Agent, or Firm* — Oblon, McClelland, Maier & Neustadt, L.L.P.

(57) ABSTRACT

An operation device includes operation input circuitry that operates a robot having a leading end and a multi-articular arm that changes a position and a posture of the leading end, a device posture sensor that detects a posture of the operation input circuitry in a first coordinate system for controlling the robot, and processing circuitry that rotates a second coordinate system rotatable relative to the first coordinate system based on the posture of the operation input device, generates motion command for the leading end of the robot in the second coordinate system based on input operation into the operation input circuitry, converts the motion command into a first-coordinate-system motion command for the leading end of the robot in the first coordinate system, outputs the first-coordinate-system motion command for controlling the robot based on the first-coordinate-system motion command, and regulates rotation of the second coordinate system about at least one axis.

20 Claims, 17 Drawing Sheets

(56) References Cited

U.S. PATENT DOCUMENTS

| | | |
|---|---|---|
| 2014/0114464 A1 | 4/2014 | Williams et al. |
| 2016/0288332 A1 | 10/2016 | Motoyoshi et al. |
| 2016/0346921 A1 | 12/2016 | Orman et al. |

FOREIGN PATENT DOCUMENTS

| | | |
|---|---|---|
| JP | 2011-224696 A | 11/2011 |
| JP | 2013-202731 A | 10/2013 |
| JP | 2016-187844 A | 11/2016 |

OTHER PUBLICATIONS

"Android IMU Control" YouTube, HEBI Robotics, Retrieved from the Internet: URL:https://www.youtube.com/watch?v=IX06j8Ncd-c, XP054979980, Apr. 15, 2015, 1 page.

Office Action dated Aug. 20, 2019 in corresponding Japanese Patent Application No. 2018-094623 (with English Translation), 26 pages.

Office Action dated Jul. 27, 2021 in Europe Patent Application No. 19 166 928.2-1205; 6pgs.

* cited by examiner ated May 16, 2018. The contents of this application are incorporated herein by reference in their entirety.

OPERATION DEVICE, CONTROL SYSTEM, CONTROL METHOD, AND NON-TRANSITORY COMPUTER-READABLE STORAGE MEDIUM

CROSS-REFERENCE TO RELATED APPLICATIONS

The present application claims priority under 35 U.S.C. § 119 to Japanese Patent Application No. 2018-094623, filed May 16, 2018. The contents of this application are incorporated herein by reference in their entirety.

BACKGROUND

Field of the Invention

The embodiments disclosed herein relate to an operation device, a control system, a control method, and a non-transitory computer-readable storage medium.

Discussion of the Background

JP 2011-224696A discloses a teaching reproduction apparatus that includes a controller and a teaching pendant. The controller controls motions of a robot. The teaching pendant is used by an operator to teach the motions to the robot.

SUMMARY

According to one aspect of the present invention, an operation device includes operation input circuitry that operates a robot having a leading end and a multi-articular arm that changes a position and a posture of the leading end, a device posture sensor that detects a posture of the operation input circuitry in a first coordinate system for controlling the robot, and processing circuitry that rotates a second coordinate system rotatable relative to the first coordinate system based on the posture of the operation input device, generates a motion command for the leading end of the robot in the second coordinate system based on an input operation into the operation input circuitry, converts the motion command into a first-coordinate-system motion command for the leading end of the robot in the first coordinate system, outputs the first-coordinate-system motion command for controlling the robot based on the first-coordinate-system motion command, and regulates a rotation of the second coordinate system about at least one axis.

According to another aspect of the present invention, a control system includes an operation device including operation input circuitry that operates a robot including a leading end and a multi-articular arm that changes a position and a posture of the leading end, a device posture sensor that detects a posture of the operation input circuitry in a first coordinate system for controlling the robot, and processing circuitry that rotates a second coordinate system rotatable relative to the first coordinate system based on the posture of the operation input device, generates a motion command for the leading end of the robot in the second coordinate system based on an input operation into the operation input circuitry, converts the motion command into a first-coordinate-system motion command for the leading end of the robot in the first coordinate system, outputs the first-coordinate-system motion command for controlling the robot based on the first-coordinate-system motion command, and regulates a rotation of the second coordinate system about at least one axis, and control circuitry that controls the robot to move the leading end of the robot using the multi-articular arm based on the first-coordinate-system motion command.

According to another aspect of the present invention, a control method for operation input circuitry that operates a robot including a leading end and a multi-articular arm that changes a position and a posture of the leading end includes detecting a posture of the operation input circuitry in a first coordinate system that is for controlling the robot, based on the posture of the operation input circuitry, rotating a second coordinate system rotatable relative to the first coordinate system, based on an operation input into the operation input circuitry, generating a motion command for the leading end of the robot in the second coordinate system, converting the motion command into a first-coordinate-system motion command for the leading end of the robot in the first coordinate system, outputting the first-coordinate-system motion command for controlling the robot based on the first-coordinate-system motion command, and regulating a rotation of the second coordinate system about at least one axis.

According to another aspect of the present invention, a non-transitory computer-readable storage medium is storing a program for causing operation input circuitry that operates a robot to perform a control method. The robot includes a leading end and a multi-articular arm that changes a position and a posture of the leading end. The control method includes detecting a posture of the operation input circuitry in a first coordinate system that is for controlling the robot, based on the posture of the operation input circuitry, rotating a second coordinate system rotatable relative to the first coordinate system, based on an operation input into the operation input circuitry, generating a motion command for the leading end of the robot in the second coordinate system, converting the motion command into a first-coordinate-system motion command for the leading end of the robot in the first coordinate system, outputting the first-coordinate-system motion command for controlling the robot based on the first-coordinate-system motion command, and regulating a rotation of the second coordinate system about at least one axis.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
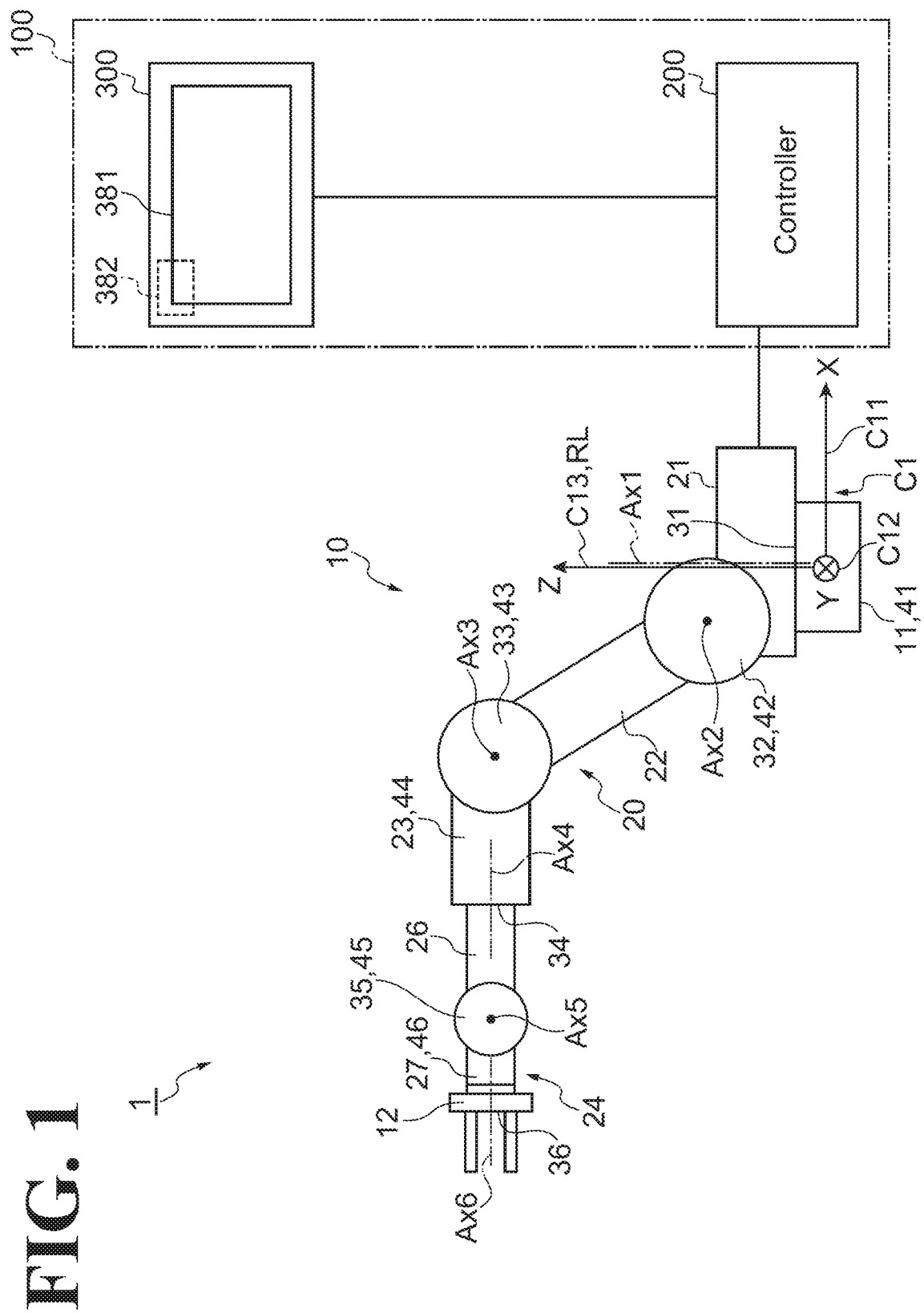
FIG. 1 is a schematic illustrating an example configuration of a robot system.

The embodiments will now be described with reference to the accompanying drawings, wherein like reference numerals specifying corresponding or identical elements throughout the various drawings.

Robot System

A robot system 1 according to this embodiment is a system that causes a robot to automatically repeat a motion taught in advance by an operator. There is no particular limitation to the application in which the robot system 1 is used. Example applications of the robot system 1 include, but are not limited to, industrial applications in which robots perform work such as machining, processing, and assembly work.

The robot system 1 includes a robot 10 and a control system 100. In this embodiment, the robot 10 is a six-axis vertical multi-articular robot and includes a base 11, a leading end 12, and a multi-articular arm 20. The base 11 is mounted or placed on a floor surface of a workspace of the robot 10. The multi-articular arm 20 connects the base 11 and the leading end 12 to each other.

The multi-articular arm 20 includes a plurality of joints. By changing the motion angles of the plurality of joints, the multi-articular arm 20 changes the position and the posture of the leading end 12 relative to the base 11. The multi-articular arm 20 includes a turnable portion 21, a first arm 22, a second arm 23, a wrist 24, and actuators 41, 42, 43, 44, 45, and 46. The turnable portion 21 is mounted on an upper portion of the base 11 turnably about vertical axis Ax1. Specifically, the multi-articular arm 20 includes a joint 31. The joint 31 makes a turnable portion 21 turnable about the axis Ax1.

The first arm 22 is connected to the turnable portion 21 swingably about axis Ax2, which crosses or is orthogonal to the axis Ax1. Specifically, the multi-articular arm 20 includes a joint 32. The joint 32 makes the first arm 22 swingable about the axis Ax2. It is to be noted that when axes "cross" each other, this means that the axes may be skew axes, as if the axes are aligned in "grade separation" arrangement. The same applies in the following description.

The second arm 23 is connected to the base end of the first arm 22 swingably about axis Ax3, which crosses the axis Ax1. Specifically, the multi-articular arm 20 includes a joint 33. The joint 33 makes the second arm 23 swingable about the axis Ax3. The axis Ax3 may be parallel to the axis Ax2.

The wrist 24 includes a turnable arm 26 and a swingable arm 27. The turnable arm 26 extends in the center of the second arm 23 and protrudes beyond the leading end of the second arm 23. The turnable arm 26 is turnable about axis Ax4, which coincides with the center of the second arm 23. Specifically, the multi-articular arm 20 includes a joint 34. The joint 34 makes the turnable arm 26 turnable about the axis Ax4. The swingable arm 27 is connected to the leading end of the turnable arm 26 swingably about axis Ax5, which crosses or is orthogonal to the axis Ax4. Specifically, the multi-articular arm 20 includes a joint 35. The joint 35 makes the swingable arm 27 swingable about the axis Ax5.

The leading end 12 is connected to the leading end of the swingable arm 27 turnably about axis Ax6, which coincides with the center of the swingable arm 27. Specifically, the multi-articular arm 20 includes a joint 36. The joint 36 makes the leading end 12 turnable about the axis Ax6.

The actuators 41, 42, 43, 44, 45, and 46 are driven by electric motors to drive the plurality of joints 31, 32, 33, 34, 35, and 36 of the multi-articular arm 20. For example, the actuator 41 causes the turnable portion 21 to turn about the axis Ax1; the actuator 42 causes the first arm 22 to swing about the axis Ax2; the actuator 43 causes the second arm 23 to swing about the axis Ax3; the actuator 44 causes the turnable arm 26 to turn about the axis Ax4; the actuator 45 causes the swingable arm 27 to swing about the axis Ax5; and the actuator 46 causes the leading end 12 to turn about axis Ax6. That is, the actuators 41 to 46 respectively drive the joints 31 to 36.

It is to be noted that the above-described configuration of the robot 10 has been presented for example purposes only; the robot 10 may have any other configuration insofar as the robot 10 is capable of changing the position and the posture of the leading end of the robot 10 relative to the base of the robot 10 using a multi-articular arm. For example, the robot 10 may be a seven-axis robot, with a redundant axis added to the above-described six-axis vertical multi-articular robot. Also, the robot 10 may be a "SCARA (Selective Compliance Assembly Robot Arm)" robot.

Control System

The control system 100 is a system to control the robot 10, and includes a controller 200 and an operation device 300. The controller 200 stores, in the form of motion programs, details of motions of the robot 10 taught by the operator, and controls the robot 10 based on the motion programs. The operation device 300 obtains an operation input made by the operator, generates a command that is based on the operation input, and outputs the command to the controller 200. An example configuration of the controller 200 and an example configuration of the operation device 300 will be described in detail below.

Controller

Figure 2:
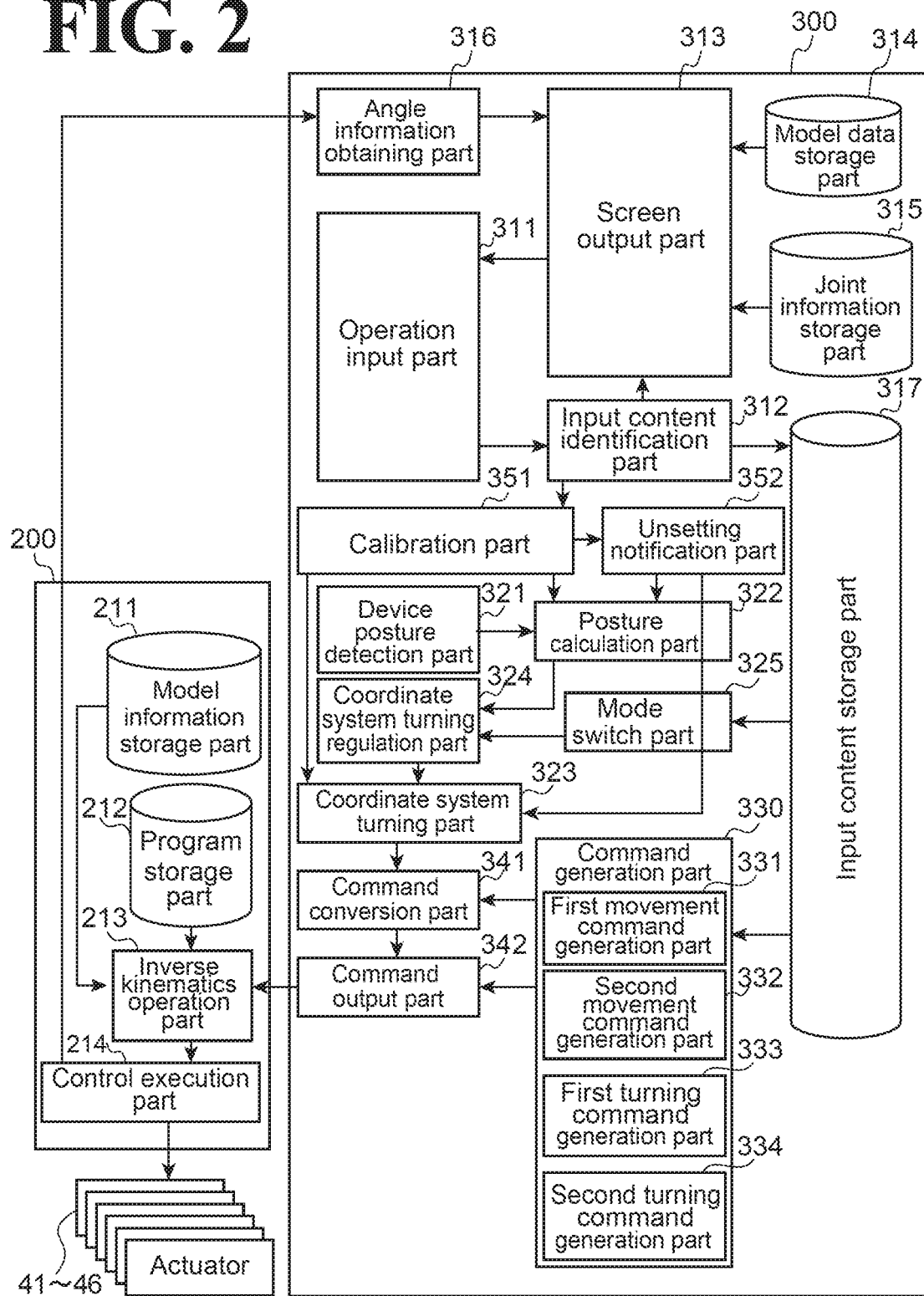
FIG. 2 is a block diagram illustrating an example functional configuration of a control system.

As illustrated in FIG. 2, the controller 200 performs: based on a motion program, controlling the robot 10 to move the leading end 12 using the multi-articular arm 20 (this control will be hereinafter referred to as "play mode control"); and, based on a control command from the operation device 300, controlling the robot 10 to move the leading end 12 using the multi-articular arm 20 (this control will be hereinafter referred to as "teaching mode control"). For example, the controller 200 includes functional configurations (hereinafter referred to as "functional modules") such as a model information storage 211, a program storage 212, an inverse kinematics operation part 213, and a control execution part 214.

The model information storage 211 stores model information including the sizes of the elements of the robot 10 (for example, the lengths of the first arm 22, the second arm 23, the turnable arm 26, and the swingable arm 27). The program storage 212 stores, in the form of motion programs, details of motions taught by the operator through the operation device 300. Each motion program includes a plurality of motion commands aligned in time order. The motion commands include a movement command that specifies a target position and a target posture of the leading end 12 relative to the base 11.

The inverse kinematics operation part 213 performs an inverse kinematics operation to calculate joint angle target values (motion angle target values of the joints 31, 32, 33, 34, 35, and 36) for moving the leading end 12 based on the target position and the target posture of the leading end 12. In the teaching mode control, based on a target position and a target posture of the leading end 12 specified by the control command from the operation device 300, the inverse kinematics operation part 213 calculates joint angle target values for moving the leading end 12. In the play mode control, the inverse kinematics operation part 213 calculates joint angle target values for moving the leading end 12 based on a target position and a target posture of the leading end 12 specified by the motion command of the motion program.

Based on the joint angle target values, the control execution part 214 controls the multi-articular arm 20 to drive the joints 31, 32, 33, 34, 35, and 36 using the actuators 41, 42, 43, 44, 45, and 46.

Operation Device

When the controller 200 performs the teaching mode control, the operation device 300 generates a control command for causing the robot 10 to make a motion based on a motion-teaching operation input, and outputs the control command to the controller 200. The operation device 300 is a "tablet terminal", and includes a touch panel 381 and a posture sensor 382.

The touch panel 381 (operation input part) is an input device made up of a display device with a contact position detection device superimposed on the display device. Examples of the display device include, but are not limited to, a liquid crystal monitor and an organic EL monitor. A non-limiting example of the contact position detection device is a touch pad. The touch panel 381 receives an operation input in the form of a contact on the screen of the display device.

The posture sensor 382 (device posture detection part, device posture detector) detects the posture of the operation device 300 (that is, the posture of the touch panel 381). A non-limiting example of the posture sensor 382 is a gyro sensor. The gyro sensor detects changes in the posture of the operation device 300 (that is, changes in the posture of the touch panel 381) about three axes approximately orthogonal to each other.

The operation device 300 performs: detecting, using the posture sensor 382, the posture of the touch panel 381 in a first coordinate system C1, which is used to control the robot 10; turning a second coordinate system C2, which is turnable relative to the first coordinate system C1, based on the posture of the touch panel 381 (see FIG. 9); based on an operation input on the touch panel 381, generating a motion command for the leading end 12 in the second coordinate system C2; converting the motion command for the leading end 12 into a first-coordinate-system motion command for the leading end 12 in the first coordinate system C1; outputting a control command for controlling the robot based on the first-coordinate-system motion command 10.

The first coordinate system C1 may be any coordinate system with which the position and the posture of the leading end 12 relative to the base 11 are uniquely determined. For example, the first coordinate system C1 is a coordinate system fixed to the base 11, and includes three coordinate axes (X axis C11, Y axis C12, and Z axis C13) approximately orthogonal to each other. The Z axis C13 is a vertical axis (perpendicular to a horizontal surface), and the upward direction of the Z axis C13 is the positive direction.

Similarly, the second coordinate system C2 includes three coordinate axes (X axis C21, Y axis C22, and Z axis C23) approximately orthogonal to each other. The turning angle of the second coordinate system C2 relative to the first coordinate system C1 is defined based on such an initial state that the X axis C21, the Y axis C22, and the Z axis C23 respectively coincide with the X axis C11, the Y axis C12, and the Z axis C13.

The operation device 300 may further perform: outputting screen data to the touch panel 381 so that an operation screen including at least one operation image is displayed on the touch panel 381. Upon execution of a point operation of specifying at least one point on the operation image, the operation device 300 may perform: determining a motion direction of the leading end 12 in the second coordinate system C2 such that the motion direction is correlated with a positional relationship between the one point and a reference point on the operation image; determining a motion scalar quantity of the leading end 12 such that the motion scalar quantity is correlated with the distance between the one point and the reference point; and generating a motion command for the leading end 12 such that the motion command includes the motion direction and the motion scalar quantity. The operation device 300 may further perform: regulating turning of the second coordinate system C2 about at least one axis.

As functional modules for displaying an operation screen and for receiving an operation input, the operation device 300 includes an operation input part 311, an input content identification part 312, a screen output part 313, a model data storage part 314, a joint information storage part 315, an angle information obtaining part 316, and an input content storage part 317. As functional modules for turning of the second coordinate system C2, the operation device 300 includes a device posture detection part 321, a posture calculation part 322, a coordinate system turning part 323, a coordinate system turning regulation part 324, a mode switch part 325, a calibration part 351, and an unsetting notification part 352. As functional modules for generation and output of a control command, the operation device 300 includes a command generation part 330, a command conversion part 341, and a command output part 342.

The operation input part 311 is an input part through which the robot 10 is operated. Specifically, the operation input part 311 displays an operation screen dedicated to receiving operation inputs, and receives an operation input on the operation screen. Example operation inputs include, but are not limited to, a point operation and a drugging operation. A point operation is an operation of specifying at least one point on an operation screen. A point operation encompasses an operation of simultaneously specifying a plurality of points on an operation screen. A drugging operation is an operation of specifying at least one point on an operation screen and moving the one point. A drugging operation encompasses an operation of specifying a plurality of points on an operation screen and moving the plurality of points. For example, the operation input part 311 is implemented by the touch panel 381. The operation input part 311 displays an operation screen on the touch panel 381 and receives, as an operation input, a touch operation on the operation screen of the touch panel 381.

The input content identification part 312 identifies the content of the operation input that has been made on the operation input part 311. Specifically, based on a positional relationship between the position of the touch operation on the touch panel 381 (hereinafter referred to as "touch position") and the operation screen, the input content identification part 312 identifies the content of the operation input that has been made on the operation input part 311. For example, when the operation screen includes at least one operation image and the touch position is located within the operation image, the input content identification part 312 identifies the content of the operation made on the operation image based on where in the operation image the point operation position is located. More specifically, when the operation screen includes an image of one button and the touch position is located within the image of the button, the input content identification part 312 determines that an operation of pressing the button has been made.

The model data storage part 314 stores model data of operation screens to be displayed on the operation input part 311. The model data storage part 314 may store model data of a plurality of different operation screens.

The joint information storage part 315 stores, on an individual joint basis (that is, for each of the plurality of joints 31, 32, 33, 34, 35, and 36), information that includes movable angle (this information will be hereinafter referred to as "joint information"). The angle information obtaining part 316 obtains status information indicating the current angles of the joints 31, 32, 33, 34, 35, and 36. Specifically, the angle information obtaining part 316 obtains the status information (indicating the current angles of the joints 31, 32, 33, 34, 35, and 36) from the control execution part 214 of the controller 200.

The input content storage part 317 stores the content of the operation input that has been made on the operation input part 311 and that has been identified by the input content identification part 312. The content stored in the input content storage part 317 is referred to at the time of performing processing based on the operation input.

The screen output part 313 outputs, to the operation input part 311, screen data so that the operation input part 311 displays an operation screen including at least one operation image. It is possible for the screen output part 313 to select one operation screen from among a plurality of different operation screens according to the operation input on the operation input part 311, and to output screen data of the selected operation screen to the operation input part 311. Specifically, based on the operation input on the operation input part 311, the screen output part 313 chooses one piece of model data from among a plurality of different pieces of model data stored in the model data storage part 314, and generates screen data based on the model data.

It is also possible for the screen output part 313 to output, to the operation input part 311, screen data of an image of an angle indicator that indicates a combination of an angle status and an angle limit of each of the joints 31, 32, 33, 34, 35, and 36 so that the operation input part 311 displays an operation screen including the image of the angle indicator. Specifically, the screen output part 313 generates data for displaying the angle indicator based on: the joint information of the joints 31, 32, 33, 34, 35, and 36 stored in the joint information storage part 315; and the status information of the joints 31, 32, 33, 34, 35, and 36 obtained by the angle information obtaining part 316.

It is also possible for the screen output part 313 to update the content displayed on the operation screen based on the content of the operation input identified by the input content identification part 312. Specifically, when the operation input has been determined as being targeted at a particular operation image, the screen output part 313 updates the screen data to indicate that the operation has been made by changing how the operation image is displayed. More specifically, when the operation input has been determined as being an operation of pressing a button on the operation screen, the screen output part 313 updates the screen data to highlight the button.

Examples of the plurality of different operation screens output by the screen output part 313 will be described in detail below. The plurality of different operation screens include an operation screen 400 and an operation screen 500. The operation screen 400 is used in a fixed coordinate system mode. The operation screen 500 is used in a movable coordinate system mode. The fixed coordinate system mode is an operation mode in which to input the first-coordinate-system motion command (for moving the leading end 12 in the first coordinate system C1). The movable coordinate system mode is an operation mode in which to input the motion command for the leading end 12 in the second coordinate system C2, which is turnable relative to the first coordinate system C1.

Figure 3:
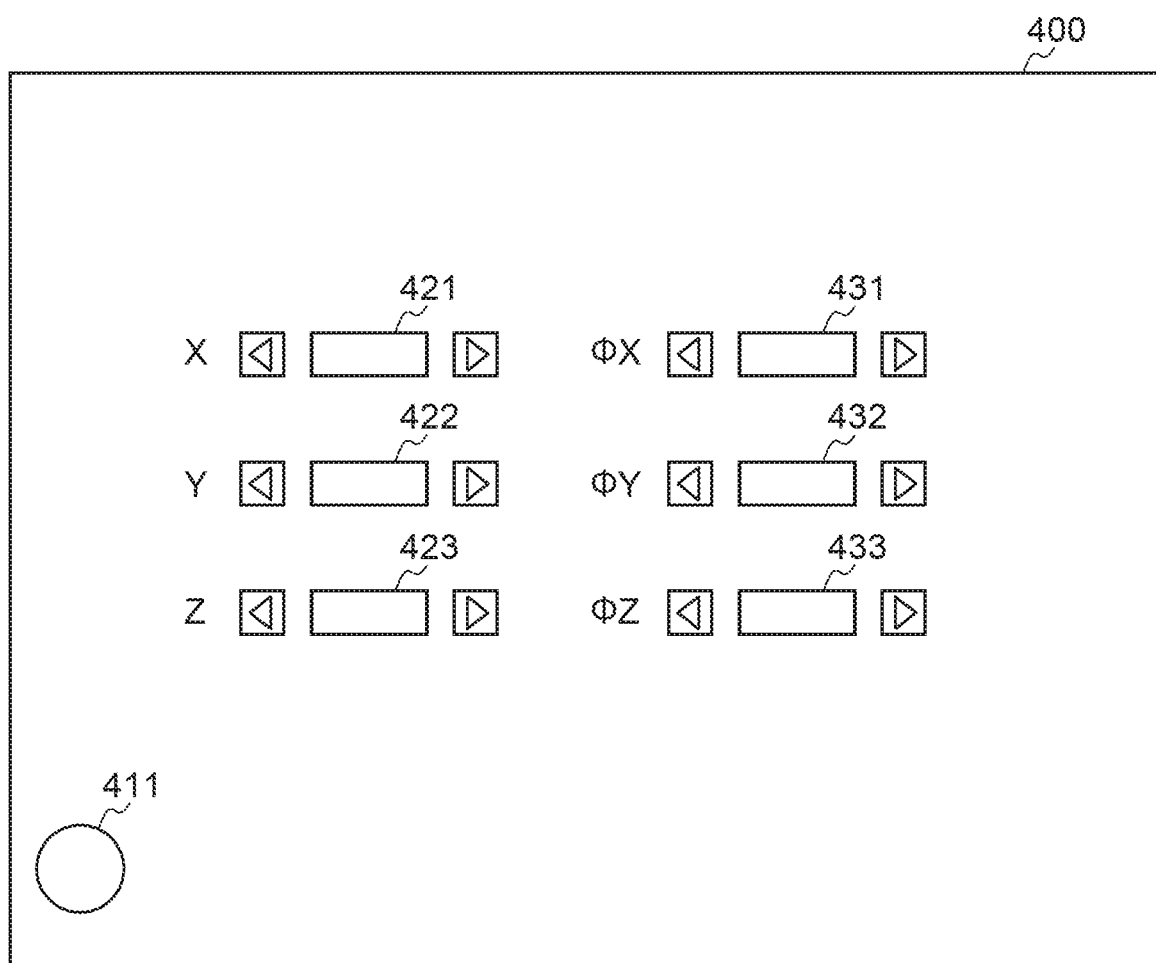
FIG. 3 is a schematic illustrating an example operation screen in a fixed coordinate system mode.

As illustrated in FIG. 3, the operation screen 400 includes position command input parts 421, 422, and 423, turning command input parts 431, 432, and 433, and input mode switch button 411. The position command input part 421 is an input part through which to specify the position of the leading end 12 on the X axis C11. The position command input part 422 is an input part through which to specify the position of the leading end 12 on the Y axis C12. The position command input part 423 is an input part through which to specify the position of the leading end 12 on the Z axis C13.

The turning command input part 431 is an input part through which to specify the turning angle of the leading end 12 about the X axis C11. The turning command input part 432 is an input part through which to specify the turning angle of the leading end 12 about the Y axis C12. The turning command input part 433 is an input part through which to specify the turning angle of the leading end 12 about the Z axis C13. The input mode switch button 411 is a button with which to switch the operation screen 400 to another operation screen. It is to be noted that the operation device 300 may include a button to switch between operation screens outside the touch panel 381. In this case, the operation screen 400 may not necessarily include the input mode switch button 411.

Figure 4:
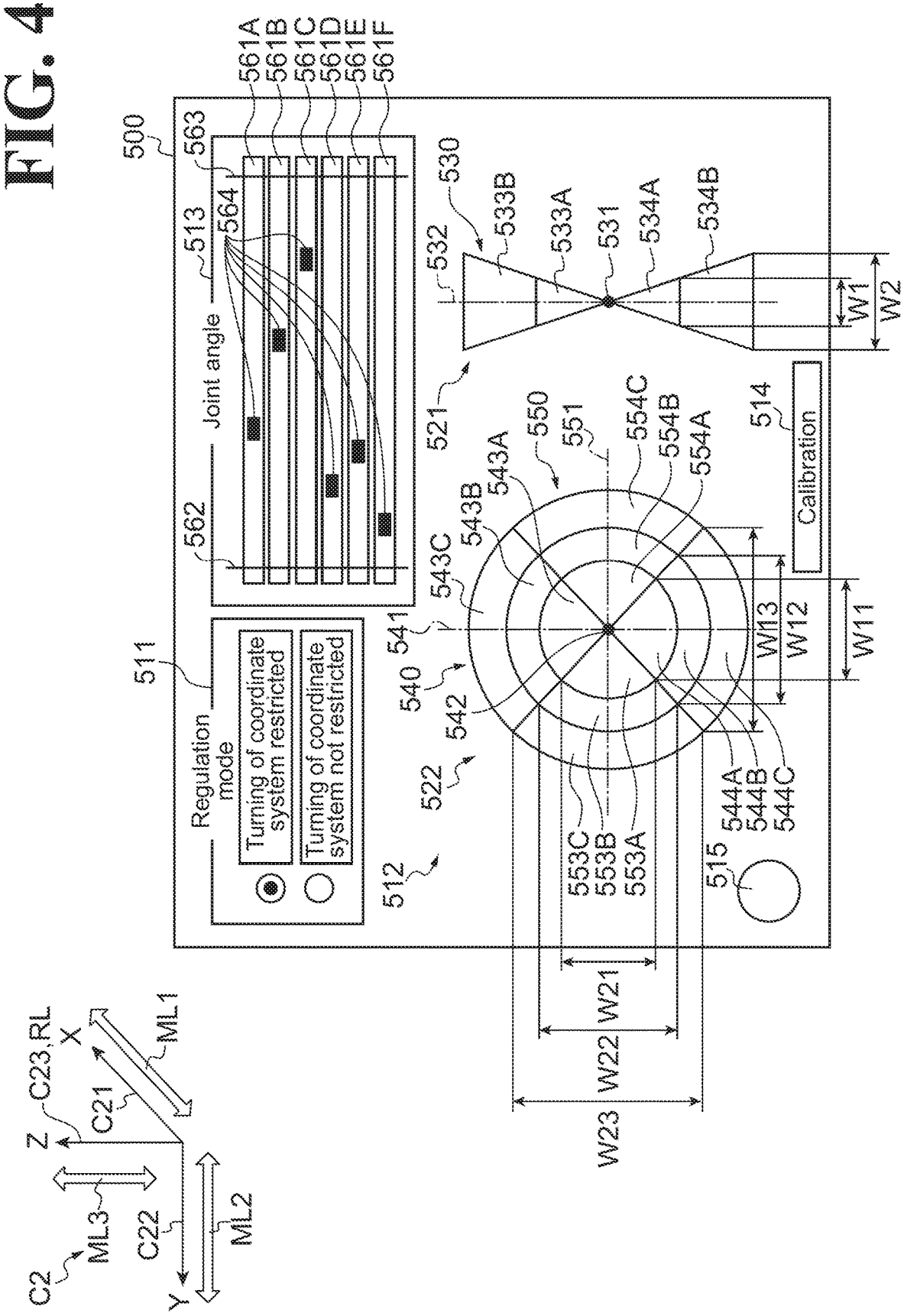
FIG. 4 is a schematic illustrating an example operation screen in a movable coordinate system mode.

As illustrated in FIG. 4, the operation screen 500 includes a regulation mode setting image 511, at least one operation image 512, an angle indicator 513, a calibration button 514, and an input mode switch button 515.

The regulation mode setting image 511 is an image on which to choose between a regulation mode and a free mode associated with the turning of the second coordinate system C2 relative to the first coordinate system C1. In the regulation mode, the turning of the second coordinate system C2 about at least one axis is regulated. In the free mode, the turning of the second coordinate system C2 is not regulated about any of the axes. A non-limiting example of the regulation mode is such a mode that the turning of the second coordinate system C2 about an axis perpendicular to the reference axis RL, which extends in one direction, is regulated while the turning of the second coordinate system C2 about the reference axis RL is allowed. This mode will be hereinafter referred to as "first regulation mode".

The reference axis RL may be a vertical axis. For example, the reference axis RL coincides with the Z axis C13 of the first coordinate system C1. In this case, in the first regulation mode, the Z axis C23 coincides with the Z axis C13, and the turning of the second coordinate system C2 about the Z axis C13 is allowed while the turning of the second coordinate system C2 about the X axis C11 and the Y axis C12 is regulated (for example, prohibited).

It is to be noted that the regulation mode will not be limited to the above-described first regulation mode. For example, the regulation mode setting image 511 may be able to choose a mode in which to regulate the turning of the second coordinate system C2 about any one axis alone.

The at least one operation image 512 is an image on which to input the motion command for the leading end 12 in the second coordinate system C2. Specifically, the at least one operation image 512 includes a movement tool image. The movement tool image is an image on which to input the motion command for the leading end 12 in the second coordinate system C2. For example, the at least one operation image 512 additionally includes a first movement tool image 521 and a second movement tool image 522. The first movement tool image 521 is an image on which to input a motion command for the leading end 12 along the reference axis RL (the Z axes C13 and C23). The second movement tool image 522 is an image on which to input a motion command for the leading end 12 along a surface perpendicular to the reference axis RL (for example, a plane including the X axis C21 and the Y axis C22).

The first movement tool image 521 includes one one-dimensional operation system 530. The one-dimensional operation system 530 is drawn along one drawn line 532, and corresponds to one movement line ML3, which is set in the second coordinate system C2. The drawn line 532 is a linear line extending in the vertical directions of the operation screen 500, and the movement line ML3 is a linear line extending along the Z axis C23.

The one-dimensional operation system 530 includes a plurality of point areas 533A and 533B and a plurality of point areas 534A and 534B. The point areas 533A and 533B are aligned in this order in the upward direction from one point on the drawn line 532 (hereinafter referred to as "reference point 531"). The point areas 534A and 534B are aligned in this order in the downward direction from the reference point 531. The point areas 533A, 533B, 534A, and 534B are areas in which to specify: a movement direction in which the leading end 12 moves along the movement line ML3; and a motion scalar quantity of the leading end 12 along the movement line ML3. The movement direction of the leading end 12 is determined based on positional relationships that the reference point 531 has with the point areas 533A, 533B, 534A, and 534B. For example, when one of the point areas 533A and 533B, which are upper in position than the reference point 531, has been chosen (by, for example, a point operation), the movement direction of the leading end 12 is determined as the positive direction of the Z axis C23. When one of the point areas 534A and 534B, which are lower in position than the reference point 531, has been chosen, the movement direction of the leading end 12 is determined as the negative direction of the Z axis C23.

The motion scalar quantity by which the leading end 12 moves is determined based on the distances from the reference point 531 to the point areas 533A, 533B, 534A, and 534B. Specifically, the point areas 533B and 534B are farther away from the reference point 531 than the point areas 533A and 534A are from the reference point 531, and when one of the point areas 533B and 534B has been chosen, the motion scalar quantity by which the leading end 12 moves is determined as a higher value than when the point area 533A or 534A has been chosen.

The widths of the plurality of point areas 533A, 533B, 534A, and 534B (widths in the direction orthogonal to the drawn line 532) may increase as the point areas 533A, 533B, 534A, and 534B are farther away from the reference point 531. Specifically, the width, W2, of each of the point areas 533B and 534B is larger than the width, W1, of each of the point areas 533A and 534A.

As illustrated in FIG. 4, the one-dimensional operation system 530 has an inverse triangle area that gradually increases in width in the upward direction from the reference point 531. A lower portion of the inverse triangle area constitutes the point area 533A, and an upper portion of the inverse triangle area constitutes the point area 533B. Similarly, the one-dimensional operation system 530 has a triangle area that gradually increases in width in the downward direction from the reference point 531. An upper portion of the triangle area constitutes the point area 534A, and a lower portion of the triangle area constitutes the point area 534B.

The second movement tool image 522 includes a plurality of one-dimensional operation systems drawn along a plurality of drawn lines that cross each other. The plurality of one-dimensional operation systems respectively correspond to a plurality of movement lines that cross each other in the second coordinate system C2. Specifically, the second movement tool image 522 includes two one-dimensional operation systems 540 and 550. The one-dimensional operation systems 540 and 550 are respectively drawn along two drawn lines 541 and 551, which are orthogonal to each other. The one-dimensional operation systems 540 and 550 respectively correspond to movement lines ML1 and ML2. The movement lines ML1 and ML2 are orthogonal to each other in the second coordinate system C2.

The drawn line 541 is a linear line extending in the vertical directions of the operation screen 500, and the movement line ML1 is a linear line along the X axis C21. The drawn line 551 is a linear line extending in the right-left directions of the operation screen 500, and the movement line ML2 is a linear line along the Y axis C22.

The one-dimensional operation system 540 includes a plurality of point areas 543A, 543B, and 543C and a plurality of point areas 544A, 544B, and 544C. The point areas 543A, 543B, and 543C are aligned in this order in the upward direction from the node of the drawn lines 541 and 551 (hereinafter referred to as "reference point 542"). The point areas 544A, 544B, and 544C are aligned in this order in the downward direction from the reference point 542. The point areas 543A, 543B, 543C, 544A, 544B, and 544C are areas in which to specify: a movement direction in which the leading end 12 moves along the movement line ML1; and a motion scalar quantity of the leading end 12 along the movement line ML1.

The movement direction of the leading end 12 is determined based on positional relationships that the reference point 542 has with the point areas 543A, 543B, 543C, 544A, 544B, and 544C. Specifically, when one of the point areas 543A, 543B, and 543C, which are upper in position than the reference point 542, has been chosen, the movement direction of the leading end 12 is determined as the positive direction of the X axis C21. When one of the point areas 544A, 544B, and 544C, which are lower in position than the reference point 542, has been chosen, the movement direction of the leading end 12 is determined as the negative direction of the X axis C21.

The motion scalar quantity by which the leading end 12 moves is determined based on the distances from the reference point 542 to the point areas 543A, 543B, 543C, 544A, 544B, and 544C. Specifically, the point areas 543B and 544B are farther away from the reference point 542 than the point areas 543A and 544A are from the reference point 542, and when one of the point areas 543B and 544B has been chosen, the motion scalar quantity by which the leading end 12 moves is determined at a higher value than when the point area 543A or 544A has been chosen. The point areas 543C and 544C are farther away from the reference point 542 than the point areas 543B and 544B are from the reference point 542, and when one of the point areas 543C and 544C has been chosen, the motion scalar quantity by which the leading end 12 moves is determined as an even higher value than when the point area 543B or 544B has been chosen.

The widths of the plurality of point areas 543A, 543B, 543C, 544A, 544B, and 544C (widths in the direction orthogonal to the drawn line 541) may increase as the point areas 543A, 543B, 543C, 544A, 544B, and 544C are farther away from the reference point 542. Specifically, the width, W12, of each of the point areas 543B and 544B may be larger than the width, W11, of each of the point areas 543A and 544A, and the width, W13, of each of the point areas 543C and 544C may be even larger than the widths W12 of each of the point areas 543B and 544B.

As illustrated in FIG. 4, the one-dimensional operation system 540 has a first fan-shaped area. The first fan-shaped area gradually increases in width in the upward direction from the reference point 542. A center portion of the first fan-shaped area constitutes the point area 543A, and an outer circumferential portion of the first fan-shaped area constitutes the point area 543C. The portion between the center portion and the outer circumferential portion constitutes the point area 543B. The one-dimensional operation system 540 also has a second fan-shaped area. The second fan-shaped area gradually increases in width in the downward direction from the reference point 542. A center portion of the second fan-shaped area constitutes the point area 544A, and an outer circumferential portion of the second fan-shaped area constitutes the point area 544C. The portion between the center portion and the outer circumferential portion constitutes the point area 544B.

The one-dimensional operation system 550 includes a plurality of point areas 553A, 553B, and 553C and a plurality of point areas 554A, 554B, and 554C. The point areas 553A, 553B, and 553C are aligned in this order in the left direction from the reference point 542. The point areas 554A, 554B, and 554C are aligned in this order in the right direction from the reference point 542. The point areas 553A, 553B, 553C, 554A, 554B, and 554C are areas in which to specify: a movement direction in which the leading end 12 moves along the movement line ML2; and a motion scalar quantity of the leading end 12 along the movement line ML2.

The movement direction of the leading end 12 is determined based on positional relationships that the reference point 542 has with the point areas 553A, 553B, 553C, 554A, 554B, and 554C. Specifically, the point areas 553A, 553B, and 553C are located on the left side of the reference point 542, and when one of the point areas 553A, 553B, and 553C has been chosen, the movement direction of the leading end 12 is determined as the positive direction of the Y axis C22. The point areas 554A, 554B, and 554C are located on the right side of the reference point 542, and when one of the point areas 554A, 554B, and 554C has been chosen, the movement direction of the leading end 12 is determined as the negative direction of the Y axis C22.

The motion scalar quantity by which the leading end 12 moves is determined based on the distances from the reference point 542 to the point areas 553A, 553B, 553C, 554A, 554B, and 554C. Specifically, the point areas 553B and 554B are farther away from the reference point 542 than the point areas 553A and 554A are from the reference point 542, and when one of the point areas 553B and 554B has been chosen, the motion scalar quantity by which the leading end 12 moves is determined as a higher value than when the point area 553A or 554A has been chosen. The point areas 553C and 554C are even farther away from the reference point 542 than the point areas 553B and 554B are from the reference point 542, and when one of the point areas 553C and 554C has been chosen, the motion scalar quantity by which the leading end 12 moves is determined as an even higher value than when the point area 553B or 554B has been chosen.

The widths of the plurality of point areas 553A, 553B, 553C, 554A, 554B, and 554C (widths in the direction orthogonal to the drawn line 551) may increase as the point areas 553A, 553B, 553C, 554A, 554B, and 554C are farther away from the reference point 542. Specifically, the width, W22, of each of the point areas 553B and 554B is larger than the width, W21, of each of the point areas 553A and 554A, and the width, W23, of each of the point areas 553C and 554C is even larger than the width, W22, of each of the point areas 553B and 554B.

As illustrated in FIG. 4, the one-dimensional operation system 550 has a third fan-shaped area. The third fan-shaped area gradually increases in width in the left direction from the reference point 542. A center portion of the third fan-shaped area constitutes the point area 553A, and an outer circumferential portion of the third fan-shaped area constitutes the point area 553C. The portion between the center portion and the outer circumferential portion constitutes the point area 553B. The one-dimensional operation system 550 also has a fourth fan-shaped area. The fourth fan-shaped area gradually increases in width in the right direction from the reference point 542. A center portion of the fourth fan-shaped area constitutes the point area 554A, and an outer circumferential portion of the fourth fan-shaped area constitutes the point area 554C. The portion between the center portion and the outer circumferential portion constitutes the point area 554B.

The angle indicator 513 is an image that displays a combination of an angle status and angle limits of each of the joints 31, 32, 33, 34, 35, and 36. The angle indicator 513 includes: a plurality of angle bars 561A, 561B, 561C, 561D, 561E, and 561F; and limit lines 562 and 563. The angle bars 561A, 561B, 561C, 561D, 561E, and 561F respectively correspond to the plurality of joints 31, 32, 33, 34, 35, and 36. The angle bars 561A, 561B, 561C, 561D, 561E, and 561F are aligned in the vertical directions and extend in the right-left directions. The angle bars 561A, 561B, 561C, 561D, 561E, and 561F each include a status marker 564. The status marker 564 is movable in the right-left directions. The joint angle of each joint is indicated by the position of the status marker 564 in the right-left directions. Specifically, as the joint angle increases, the status marker 564 moves in the right direction.

The limit line 562 is a line indicating a lower limit of the joint angle, and crosses the left ends of the angle bars 561A, 561B, 561C, 561D, 561E, and 561F. The limit line 563 is a line indicating an upper limit of the joint angle, and crosses the right ends of the angle bars 561A, 561B, 561C, 561D, 561E, and 561F.

The calibration button 514 is a button on which to instruct that the posture of the second coordinate system C2 relative to the first coordinate system C1 be a preset initial posture.

A non-limiting example of the initial posture is such a posture that the X axis C21, the Y axis C22, and the Z axis C23 respectively coincide with the X axis C11, the Y axis C12, and the Z axis C13.

The input mode switch button 515 is a button with which to switch the operation screen 500 to another operation screen. As described above, the operation device 300 may include a button to switch between operation screens outside the touch panel 381, in which case the operation screen 500 may not necessarily include the input mode switch button 515.

It is to be noted that the plurality of different operation screens may include other operation screens than the operation screens 400 and 500. For example, a plurality of different operation screens may include an operation screen on which to operate the robot 10 in a mode different from the fixed coordinate system mode and the movable coordinate system mode (for example, an operation mode in which the leading end 12 moves in a coordinate system different from the first coordinate system C1 and the second coordinate system C2). Also, the screen configurations of the operation screens 400 and 500 may be subject to change as necessary.

Figure 5:
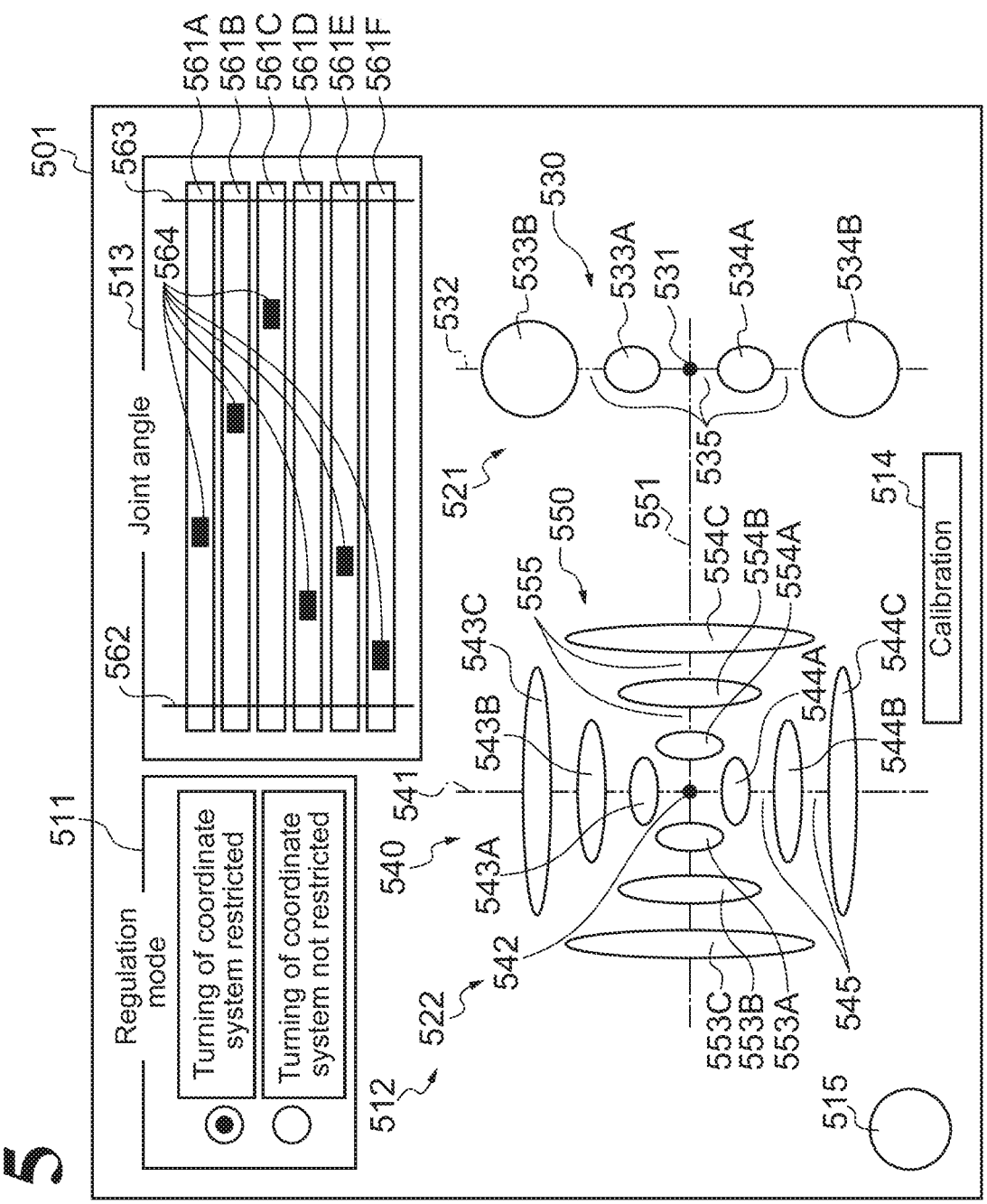
FIG. 5 is a schematic illustrating a modification operation screen in the movable coordinate system mode.

In an operation screen 501 illustrated in FIG. 5, the point areas 533A, 533B, 534A, and 534B of the one-dimensional operation system 530 have elliptic shapes; the point areas 543A, 543B, 543C, 544A, 544B, and 544C of the one-dimensional operation system 540 have elliptic shapes; and the point areas 553A, 553B, 553C, 554A, 554B, and 554C of the one-dimensional operation system 550 have elliptic shapes. In the operation screen 501 as well, the widths of the plurality of point areas 533A, 533B, 534A, and 534B increase as the point areas 533A, 533B, 534A, and 534B are farther away from the reference point 531. The widths of the plurality of point areas 543A, 543B, 543C, 544A, 544B, and 544C increase as the point areas 543A, 543B, 543C, 544A, 544B, and 544C are farther away from the reference point 542. The widths of the plurality of point areas 553A, 553B, 553C, 554A, 554B, and 554C increase as the point areas 553A, 553B, 553C, 554A, 554B, and 554C are farther away from the reference point 542.

In the one-dimensional operation system 530, the point areas next to each other are out of contact with each other, so that if the space between two adjoining point areas is specified, no motion command for the leading end 12 is generated. Specifically, the one-dimensional operation system 530 includes dead areas 535 between point areas. In the dead areas 535, point operations are disregarded. In the one-dimensional operation system 540 as well, the point areas next to each other are out of contact with each other, so that if the space between two adjoining point areas is specified, no motion command for the leading end 12 is generated. Specifically, the one-dimensional operation system 540 includes dead areas 545 between the point areas. In the dead areas 545, point operations are disregarded. In the one-dimensional operation system 550 as well, the point areas next to each other are out of contact with each other, so that if the space between two adjoining point areas is specified, no motion command for the leading end 12 is generated. Specifically, the one-dimensional operation system 550 includes dead areas 555 between the point areas. In the dead areas 555, point operations are disregarded.

Figure 6:
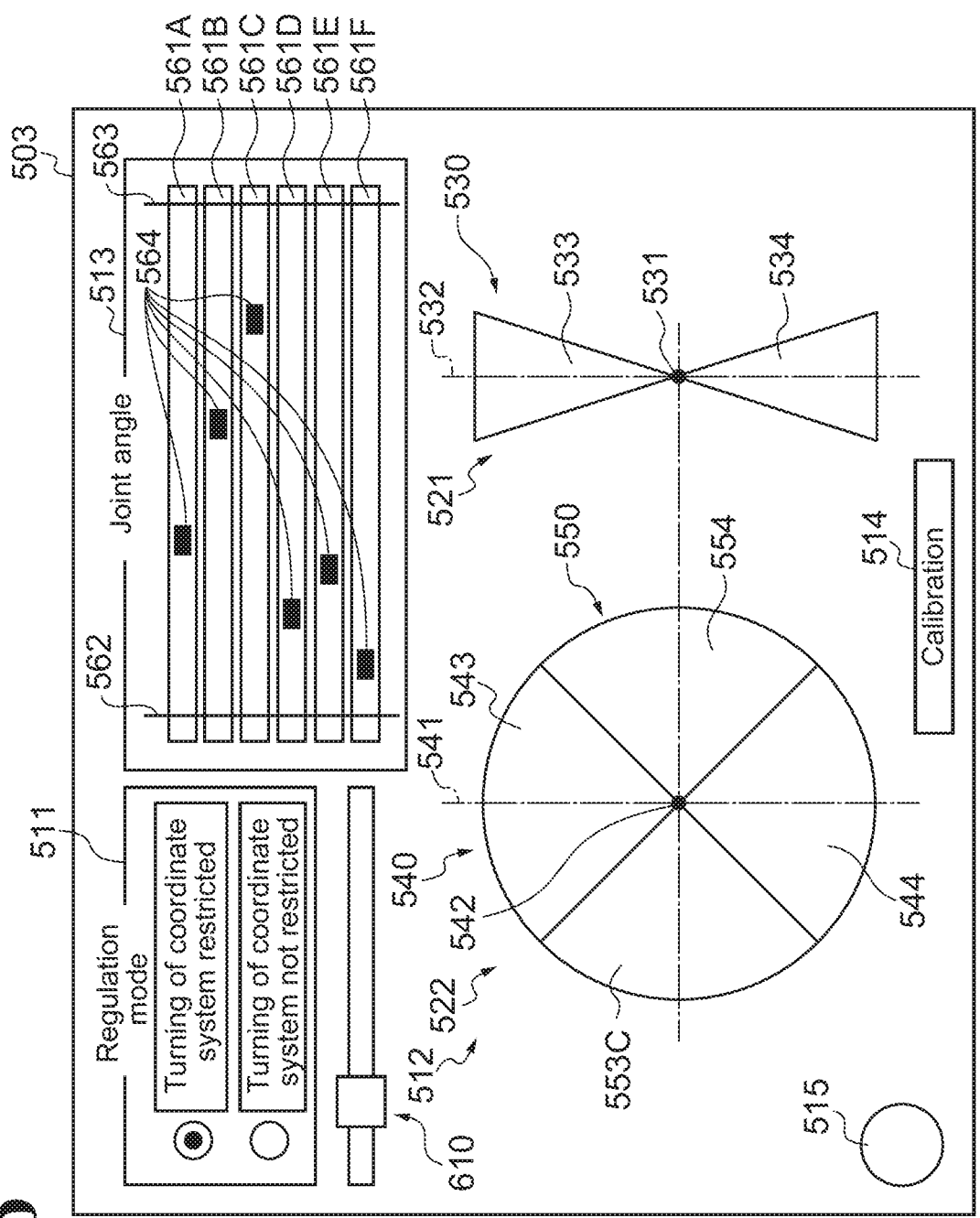
FIG. 6 is a schematic illustrating another modification operation screen in the movable coordinate system mode.

An operation screen 503 illustrated in FIG. 6 is an operation screen equivalent to the operation screen 500 with a quantity setting tool image 610 added. The quantity setting tool image 610 is an image on which to specify a scalar quantity for a motion command input on the operation image 512. Thus, the motion scalar quantity for the motion command is specified on the quantity setting tool image 610. This eliminates the need for specifying the motion scalar quantity for the motion command on the operation image 512. With this configuration, in the one-dimensional operation system 530 of the operation screen 503, the plurality of point areas 533A and 533B are integrated into one point area 533, and the plurality of point areas 534A and 534B are integrated into one point area 534. Also, in the one-dimensional operation system 540 of the operation screen 503, the plurality of point areas 543A, 543B, and 543C are integrated into one point area 543, and the plurality of point areas 544A, 544B, and 544C are integrated into one point area 544. Also, in the one-dimensional operation system 550 of the operation screen 503, the plurality of point areas 553A, 553B, and 553C are integrated into one point area 553, and the plurality of point areas 554A, 554B, and 554C are integrated into one point area 554.

Figure 7:
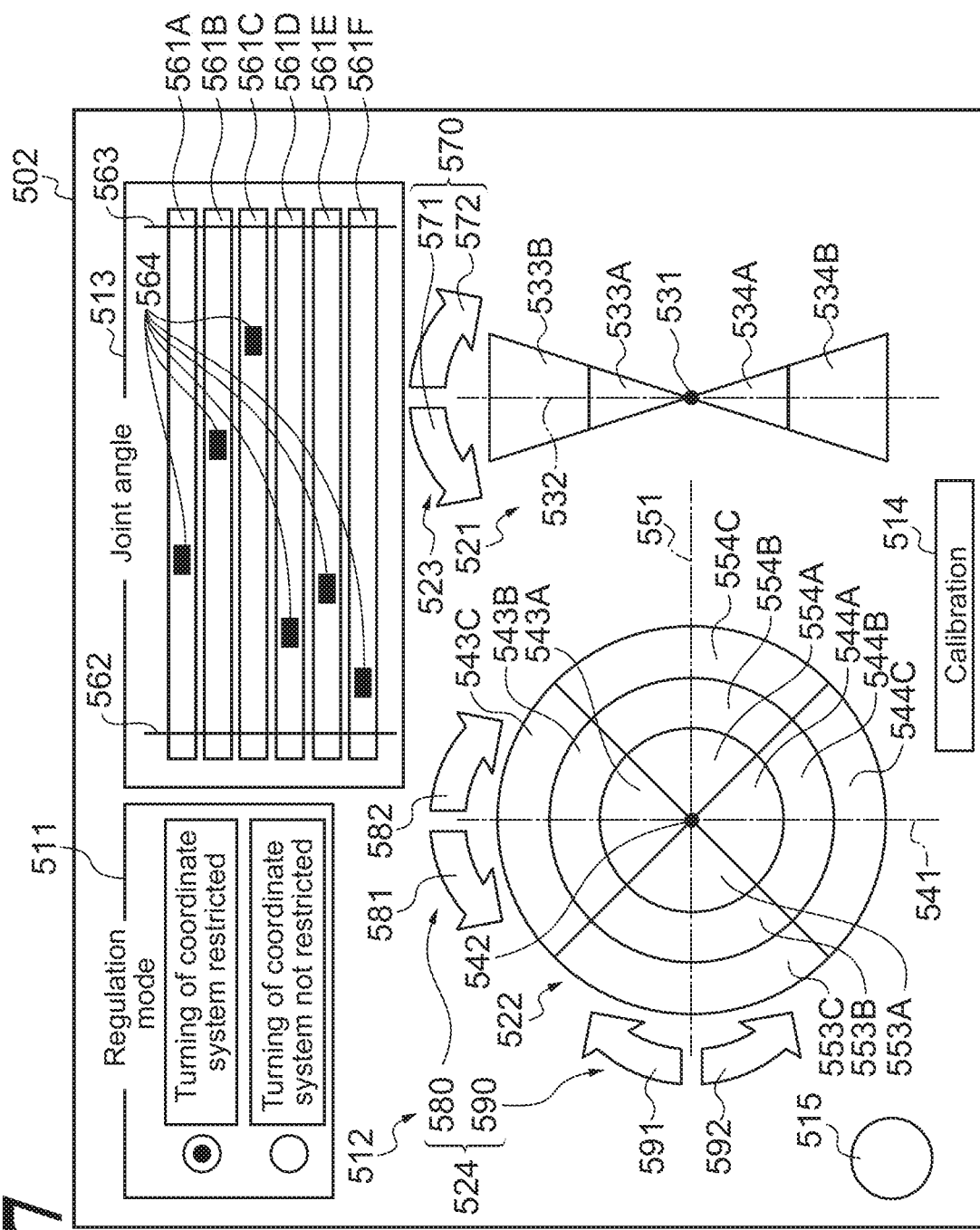
FIG. 7 is a schematic illustrating another modification operation screen in the movable coordinate system mode.

An operation screen 502 illustrated in FIG. 7 is an operation screen equivalent to the operation screen 500 with a first turning tool image 523 and a second turning tool image 524 added. The first turning tool image 523 and the second turning tool image 524 are one kind of the operation image 512. Specifically, the first turning tool image 523 and the second turning tool image 524 are images on which to input a command for turning the leading end 12 in the second coordinate system C2.

The first turning tool image 523 includes one uni-axis operation system 570. The uni-axis operation system 570 is drawn in correlation with the drawn line 532. The uni-axis operation system 570 includes two point areas 571 and 572. The two point areas 571 and 572 are located outside the one-dimensional operation system 530 with the drawn line 532 located between the point areas 571 and 572. The point areas 571 and 572 are areas in which to specify the turning direction of the leading end 12 about the movement line ML3, which corresponds to the drawn line 532. The turning direction of the leading end 12 when the point area 571 has been chosen is opposite to the turning direction of the leading end 12 when the point area 572 has been chosen. In order to make this configuration recognizable more intuitively, the point areas 571 and 572 are shown in curved arrows pointed in directions away from the drawn line 532.

The second turning tool image 524 includes two uni-axis operation systems 580 and 590. The uni-axis operation systems 580 and 590 are respectively drawn in correlation with the drawn lines 541 and 551. The uni-axis operation system 580 includes two point areas 581 and 582. The point areas 581 and 582 are located outside the one-dimensional operation system 540 with the drawn line 541 located between the point areas 581 and 582. The point areas 581 and 582 are areas in which to specify the turning direction of the leading end 12 about the movement line ML1, which corresponds to the drawn line 541. The turning direction of the leading end 12 when the point area 581 has been chosen is opposite to the turning direction of the leading end 12 when the point area 582 has been chosen. In order to make this configuration recognizable more intuitively, the point areas 581 and 582 are shown in curved arrows pointed in directions away from the drawn line 541.

The uni-axis operation system 590 includes two point areas 591 and 592. The point areas 591 and 592 are located outside the one-dimensional operation system 550 with the drawn line 551 located between the point areas 591 and 592. The point areas 591 and 592 are areas in which to specify the turning direction of the leading end 12 about the movement line ML2, which corresponds to the drawn line 551. The turning direction of the leading end 12 when the point area 591 has been chosen is opposite to the turning direction of the leading end 12 when the point area 592 has been chosen. In order to make this configuration recognizable more intuitively, the point areas 591 and 592 are shown in curved arrows pointed in directions away from the drawn line 551.

As illustrated in FIGS. 4 to 7, the reference points 531, 542 and the drawn line 532, 541, and 551 are illustrated in all of the operation screens 500, 501, 502, and 503. The reference points and the drawn lines, however, may not necessarily be illustrated. Even if no reference point is illustrated in the operation image 512, the operation image 512 can be regarded as having a reference point if the following conditions are met with any one point on the operation image 512 being regarded as a reference point.
Condition 1) A positional relationship between a point specified by a point operation (hereinafter referred to as "operation point") and the reference point is correlated with the movement direction of the leading end 12.
Condition 2) The distance between the operation point and the reference point is correlated with the motion scalar quantity by which the leading end 12 moves.

Also, even if no drawn line is illustrated in the operation image 512, the operation image 512 can be regarded as having a drawn line if the following conditions are met.
Condition 11) The operation image 512 includes a one-dimensional operation system that apparently extends along one line.
Condition 12) If a point operation is made with respect to the one-dimensional operation system, the leading end 12 moves along one line fixed to the second coordinate system C2.

Referring again to FIG. 2, the device posture detection part 321 detects the posture of the operation input part 311 in the first coordinate system C1. The device posture detection part 321 is implemented by the posture sensor 382.

Figure 8:
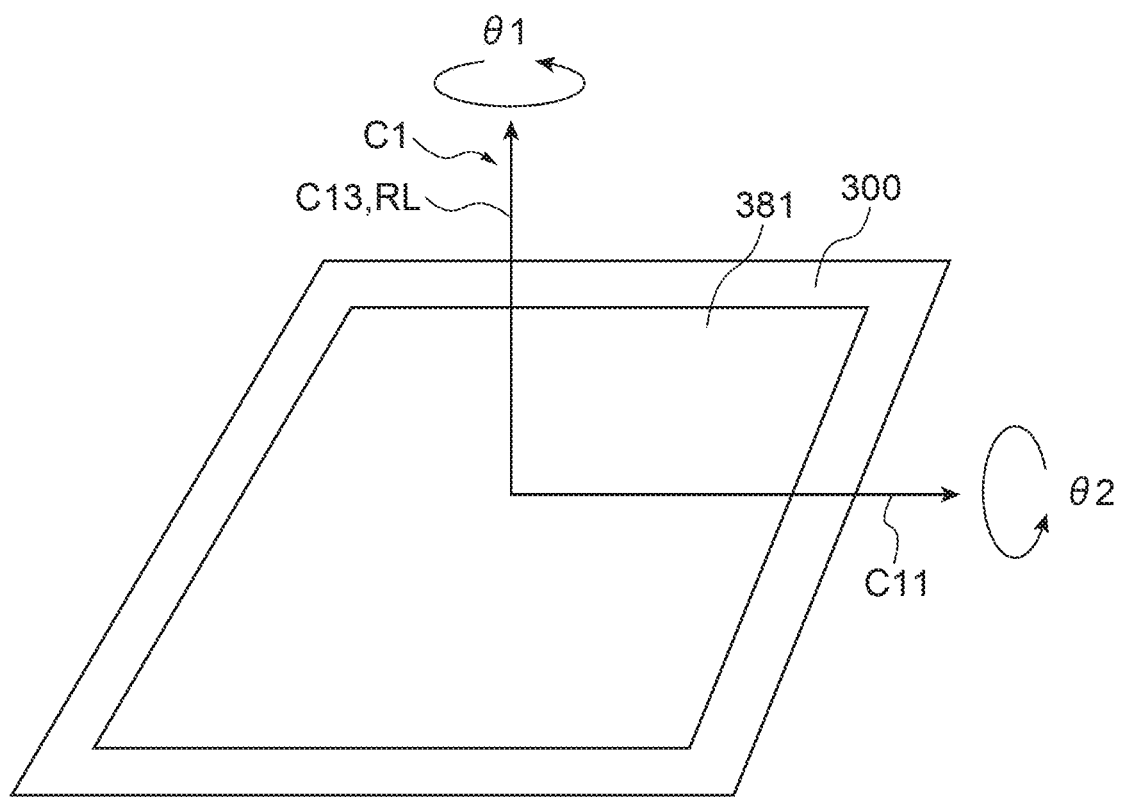
FIG. 8 is a schematic illustrating an example posture of a touch panel.

When the regulation mode has been chosen on the regulation mode setting image 511 to regulate the turning of the second coordinate system C2 about at least one axis (for example, an axis perpendicular to the reference axis RL), the posture calculation part 322 calculates, based on information detected by the device posture detection part 321, the turning angle of the operation input part 311 about an axis perpendicular to the one axis. Specifically, when the first regulation mode has been chosen on the regulation mode setting image 511, the posture calculation part 322 calculates: the turning angle, $\theta 1$, of the operation input part 311 about the reference axis RL (for example, the Z axis C13); and the turning angle, $\theta 2$, of the operation input part 311 about an axis perpendicular to the reference axis RL (see FIG. 8). The axis perpendicular to the reference axis RL may be parallel to the display surface of the touch panel 381 or may be in contact with the display surface of the touch panel 381.

Figure 9:
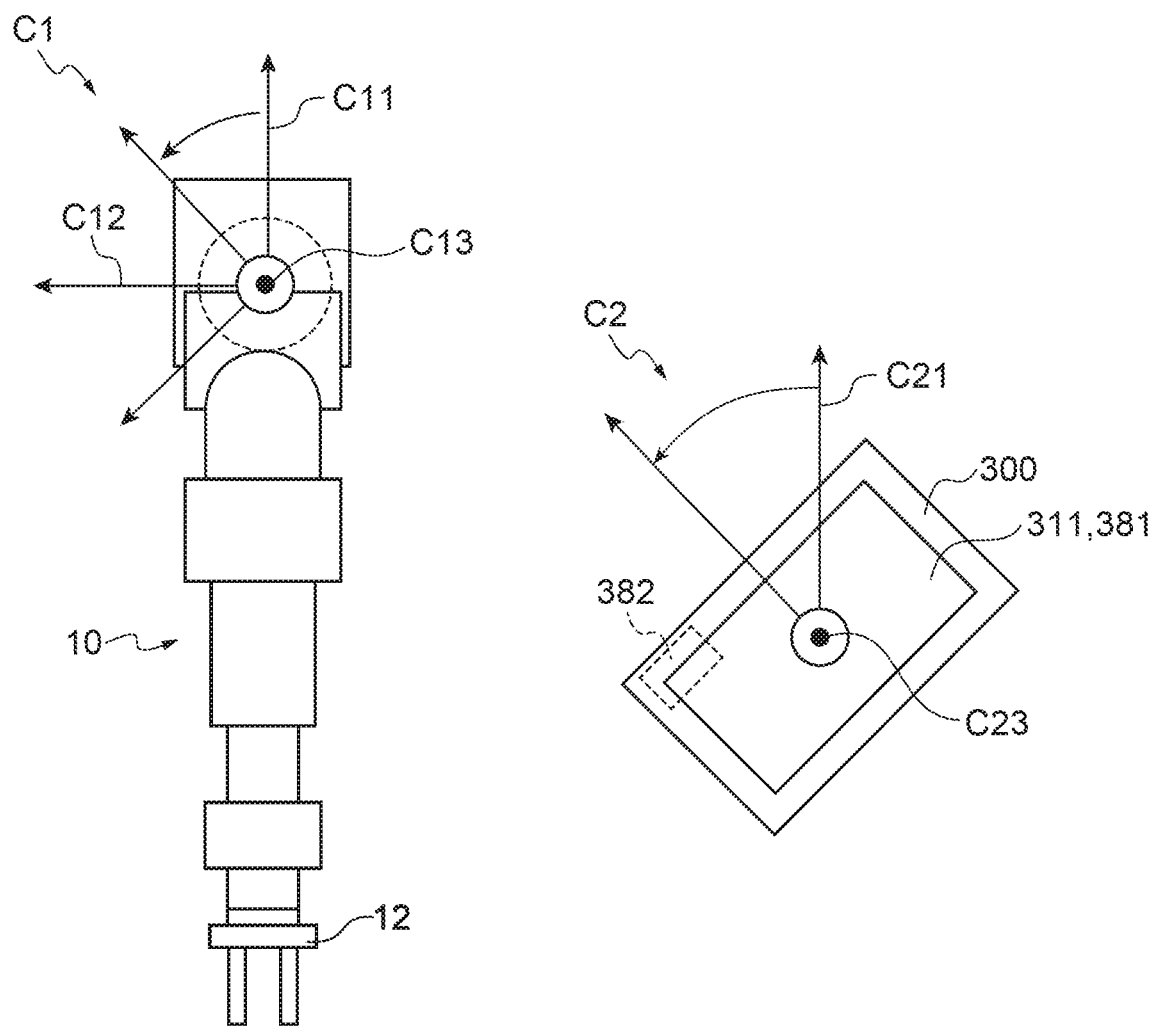
FIG. 9 is a schematic illustrating an example of coordinate system turning processing.

The coordinate system turning part 323 turns the second coordinate system C2 based on the posture of the operation input part 311. FIG. 9 illustrates an example of processing performed by the coordinate system turning part 323 in a case where the operation input part 311 turns about the Z axis C13. In this case, the coordinate system turning part 323 turns the second coordinate system C2 in the direction about the Z axis C13 identical to the turning direction of the operation input part 311. At the same time, the coordinate system turning part 323 makes the turning angle of the second coordinate system C2 about the Z axis C13 equal to the turning angle of the operation input part 311 about the Z axis C13.

When the regulation mode has been chosen to regulate the turning of the second coordinate system C2 about at least one axis (for example, an axis perpendicular to the reference axis RL), the coordinate system turning part 323 may obtain, from the posture calculation part 322, the turning angle of the operation input part 311 about the one axis. Then, based on the turning angle of the operation input part 311 that has been obtained, the coordinate system turning part 323 may turn the second coordinate system C2 about the one axis (for example, the reference axis RL).

The coordinate system turning regulation part 324 regulates the turning of the second coordinate system C2 about at least one axis. Specifically, the coordinate system turning regulation part 324 regulates the turning of the second coordinate system C2 in the first regulation mode. That is, the coordinate system turning regulation part 324 regulates the turning of the second coordinate system C2 about the axis perpendicular to the reference axis RL while allowing the turning of the second coordinate system C2 about the reference axis RL.

The reference axis may be a vertical axis. In this case, the Z axis C23 coincides with the Z axis C13, and the coordinate system turning regulation part 324 regulates (for example, prohibits) the turning of the second coordinate system C2 about the X axis C11 and the Y axis C12 while allowing the turning of the second coordinate system C2 about the Z axis C13. It is to be noted that the regulation mode will not be limited to the above-described first regulation mode. For example, the coordinate system turning regulation part 324 may regulate the turning of the second coordinate system C2 about any one axis.

The mode switch part 325 switches between the regulation mode and the free mode. In the regulation mode, the coordinate system turning regulation part 324 regulates the turning of the second coordinate system C2. In the free mode, the coordinate system turning regulation part 324 does not regulate the turning of the second coordinate system C2. The mode switch part 325 may switch between the regulation mode and the free mode based on an input into the operation input part 311. Specifically, the mode switch part 325 switches between the regulation mode and the free mode based on an input on the regulation mode setting image 511. When a plurality of different regulation modes are available on the regulation mode setting image 511, the mode switch part 325 may switch between the regulation modes for the coordinate system turning regulation part 324 to regulate the turning of the second coordinate system C2.

Based on an input into the operation input part 311, the calibration part 351 performs a calibration of setting the posture of the second coordinate system C2 relative to the first coordinate system C1 at a preset initial posture. Specifically, the calibration part 351 performs the calibration upon execution of a point operation on the calibration button 514 of the operation screen 500. A non-limiting example of the initial posture is such a posture that the X axis C21, the Y axis C22, and the Z axis C23 respectively coincide with the X axis C11, the Y axis C12, and the Z axis C13.

Figure 10:
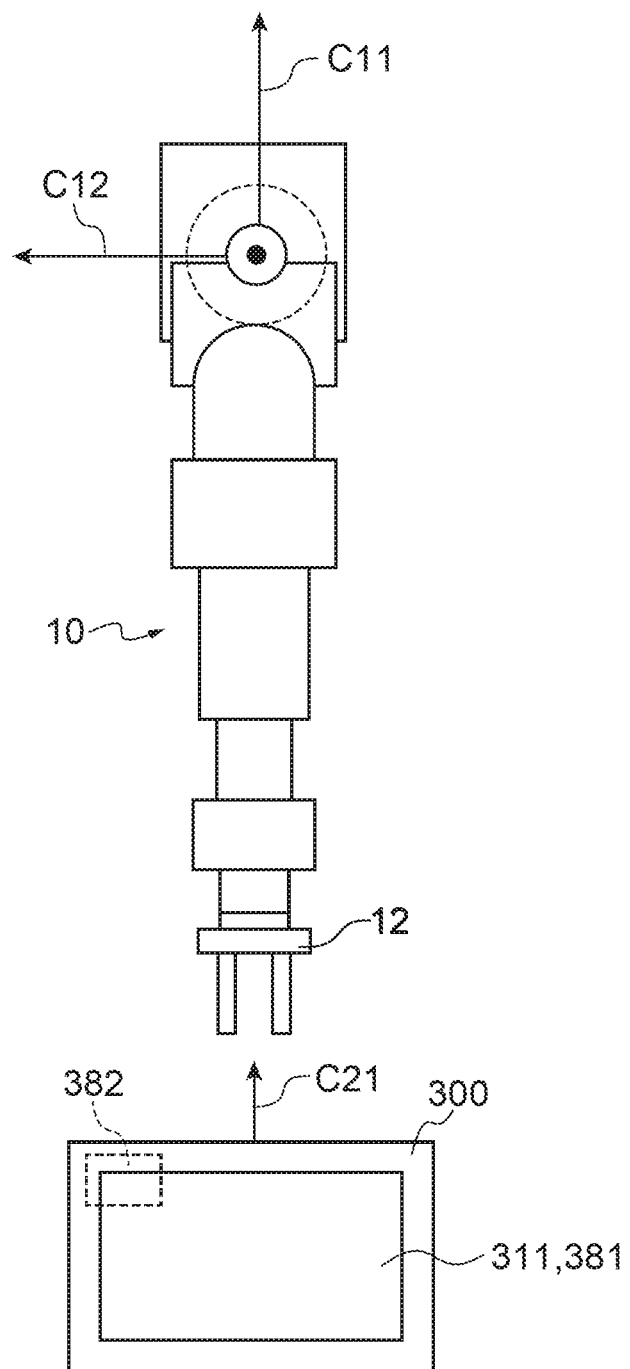
FIG. 10 is a schematic illustrating an example of how a calibration-related element is arranged.

As illustrated in FIG. 10, the calibration may be performed with the vertical directions of the operation screen of the operation input part 311 coinciding with the X axis C11. This ensures that in the operations that follow, the vertical directions of the operation screen are kept coinciding with the X axis C21 of the second coordinate system C2, and the right-left directions of the operation input part 311 kept coinciding with the Y axis C22 of the second coordinate system C2.

When no calibration has been performed by the calibration part 351, the unsetting notification part 352 notifies that the initial posture has not been set. Specifically, at the time of activation of the robot system 1, the unsetting notification part 352 sets the posture of the second coordinate system C2 at the initial posture. This processing is performed irrespective of the orientation of the operation screen of the operation input part 311. This creates such a possibility that in the operations that follow, the vertical directions of the operation screen do not coincide with the X axis C21 of the second coordinate system C2, and the right-left directions of the operation input part 311 do not coincide with the Y axis C22 of the second coordinate system C2. This state will be hereinafter referred to as "direction mis-matching state". When the direction mis-matching state has occurred, the operator is notified that no calibration has been performed. It is to be noted that the unsetting notification part 352 may notify that no calibration has been performed in the form of a warning on the operation input part 311.

The command generation part 330 generates a motion command for the robot 10 based on the kind of operation mode currently chosen. For example, when the operation mode currently chosen is the fixed coordinate system mode, the command generation part 330 generates, based on an input on the operation screen 400 (which is dedicated to the fixed coordinate system mode), a first-coordinate-system motion command (for moving the leading end 12 in the first coordinate system C1).

When the operation mode currently chosen is the movable coordinate system mode, the command generation part 330 generates, based on an input on the operation screen 500 (which is dedicated to the movable coordinate system mode), a motion command for the leading end 12 in the second coordinate system C2. Specifically, upon execution of a point operation of specifying at least one point on the operation image 512, the command generation part 330 determines a motion direction of the leading end 12 in the second coordinate system C2 such that the motion direction is correlated with a positional relationship between the one point and a reference point on the operation image 512; determines a motion scalar quantity of the leading end 12 such that the motion scalar quantity is correlated with the distance between the one point and the reference point; and generates a motion command for the leading end 12 such that the motion command includes the motion direction and the motion scalar quantity. As used herein, the term scalar quantity refers to a quantity associated with a motion. Examples of the motion scalar quantity include, but are not limited to: the speed at which the leading end 12 moves; the amount of a motion pitch; and the amount of acceleration.

The command generation part 330 includes a first movement command generation part 331 and a second movement command generation part 332, as more meticulously segmented functional modules. The first movement command generation part 331 generates, based on an input on the first movement tool image 521, a movement command for the leading end 12 along the reference axis RL (for example, the Z axis C23). Specifically, upon execution of a point operation of specifying at least one point in the one-dimensional operation system 530, the first movement command generation part 331 determines the movement direction such that on the movement line ML3, which corresponds to the one-dimensional operation system 530, the movement direction is correlated with a positional relationship between the one point and the reference point 531 of the one-dimensional operation system 530; determines the motion scalar quantity such that on the movement line ML3, the motion scalar quantity is correlated with the distance between the one point and the reference point 531; and generates the movement command such that on the movement line ML3, the movement command includes the movement direction and the motion scalar quantity.

Specifically, upon execution of a point operation of specifying any one point area in the one-dimensional operation system 530 (any one of the point areas 533A, 533B, 534A, and 534B), the first movement command generation part 331 determines the movement direction such that on the movement line ML3, which corresponds to the one-dimensional operation system 530, the movement direction is correlated with a positional relationship between the point area and the reference point 531; and determines the motion scalar quantity such that on the movement line ML3, the motion scalar quantity is correlated with the distance between the point area and the reference point 531.

The second movement command generation part 332 generates, based on an operation input on the second movement tool image 522, a movement command for the leading end 12 in the second coordinate system C2 along an axis orthogonal to the reference axis RL (for example, the X axis C21 and the Y axis C22). Specifically, upon execution of a point operation of specifying at least one point in one of the one-dimensional operation systems 540 and 550, the second movement command generation part 332 determines the movement direction such that on the movement line corresponding to the one-dimensional operation system, the movement direction is correlated with a positional relationship between the one point and a reference point in the one-dimensional operation system; and determines the motion scalar quantity by which the leading end 12 moves such that on the movement line corresponding to the one-dimensional operation system, the motion scalar quantity is correlated with the distance between the one point and the reference point.

Specifically, upon execution of a point operation of specifying any one point area in the one-dimensional operation system 540 (any one of the point areas 543A, 543B, 543C, 544A, 544B, and 544C), the second movement command generation part 332 determines the movement direction such that on the movement line ML1, which corresponds to the one-dimensional operation system 540, the movement direction is correlated with a positional relationship between the point area and the reference point 542; and determines the motion scalar quantity by which the leading end 12 moves such that on the movement line ML1, the motion scalar quantity is correlated with the distance between the point area and the reference point 542.

Upon execution of a point operation of specifying any one point area in the one-dimensional operation system 550 (any one of the point areas 553A, 553B, 553C, 554A, 554B, and 554C), the second movement command generation part 332 determines the movement direction such that on the movement line ML2, which corresponds to the one-dimensional operation system 550, the movement direction is correlated with a positional relationship between the point area and the reference point 542; and determines the motion scalar quantity by which the leading end 12 moves such that the motion scalar quantity is correlated with the distance between the point area and the reference point 542.

As described above by referring to the operation screen 503 (see FIG. 6), the operation screen may further include the quantity setting tool image 610. In this case, the first movement command generation part 331 and the second movement command generation part 332 may determine the motion scalar quantity included in the movement command based on an input on the quantity setting tool image 610. In this case, the first movement command generation part 331 and the second movement command generation part 332 determine the movement direction of the leading end 12 based on a point operation of specifying the point area 533, 534, 543, 544, 553, or 554.

When the regulation mode has been chosen to regulate the turning of the second coordinate system C2 about at least one axis (for example, an axis perpendicular to the reference axis RL), the first movement command generation part 331 and the second movement command generation part 332 may obtain, from the posture calculation part 322, the turning angle of the operation input part 311 about an axis perpendicular to the one axis. Then, based on the turning angle of the operation input part 311 that has been obtained, the first movement command generation part 331 and the second movement command generation part 332 may determine the motion scalar quantity included in the movement command.

As described above by referring to the operation screen 502 (see FIG. 7), the operation screen may further include the first turning tool image 523 and the second turning tool image 524. In this case, the command generation part 330 may generate, based on an input on the first turning tool image 523 and the second turning tool image 524, a turning command for the leading end 12 in the second coordinate system C2.

Specifically, the command generation part 330 may further include a first turning command generation part 333 and a second turning command generation part 334. The first turning command generation part 333 generates, based on an input on the first turning tool image 523, a turning command for the leading end 12 about the reference axis RL (for example, the Z axis C23). Specifically, upon execution of a point operation of specifying at least one point in the uni-axis operation system 570, the first turning command generation part 333 determines the turning direction such that the motion direction is correlated with a positional relationship between the one point and the drawn line 532 about the movement line ML3, which corresponds to the uni-axis operation system 570. Specifically, upon execution of a point operation of specifying any one point area in the uni-axis operation system 570 (any one of the point areas 571 and 572), the first turning command generation part 333 determines the turning direction of the leading end 12 about the movement line ML3, which corresponds to the uni-axis operation system 570.

The second turning command generation part 334 generates, based on an operation input on the second turning tool image 524, a turning command for the leading end 12 about an axis orthogonal to the reference axis RL (for example, the X axis C21 and the Y axis C22). Specifically, upon execution of a point operation of specifying at least one point in one of the uni-axis operation systems 580 and 590, the second turning command generation part 334 determines the turning direction such that the turning direction is correlated with a positional relationship between the one point and the drawn line of the uni-axis operation system about the movement line corresponding to the uni-axis operation system. Specifically, upon execution of a point operation of specifying any one point area in the uni-axis operation system 580 (any one of the point areas 581 and 582), the second turning command generation part 334 determines the turning direction such that the turning direction is correlated with a positional relationship between the point area and the drawn line 541 about the movement line ML1, which corresponds to the uni-axis operation system 580. Upon execution of a point operation of specifying any one point area in the uni-axis operation system 590 (any one of the point areas 591 and 592), the second turning command generation part 334 determines the turning direction such that the turning direction is correlated with a positional relationship between the point area and the drawn line 551 about the movement line ML2, which corresponds to the uni-axis operation system 590.

When the command generation part 330 generates a motion command for the leading end 12 in the second coordinate system C2, the command conversion part 341 converts the motion command into a first-coordinate-system motion command (for the leading end 12 in the first coordinate system C1). Specifically, the command conversion part 341 calculates the first-coordinate-system motion command (for the leading end 12 in the first coordinate system C1) by multiplying the motion command for the leading end 12 in the second coordinate system C2 by a turning matrix that corresponds to the turning angle of the second coordinate system C2 relative to the first coordinate system C1. The command output part 342 outputs, to the inverse kinematics operation part 213 of the controller 200, a control command for controlling the robot 10 based on the first-coordinate-system motion command.

Hardware Configuration of Control System

Figure 11:
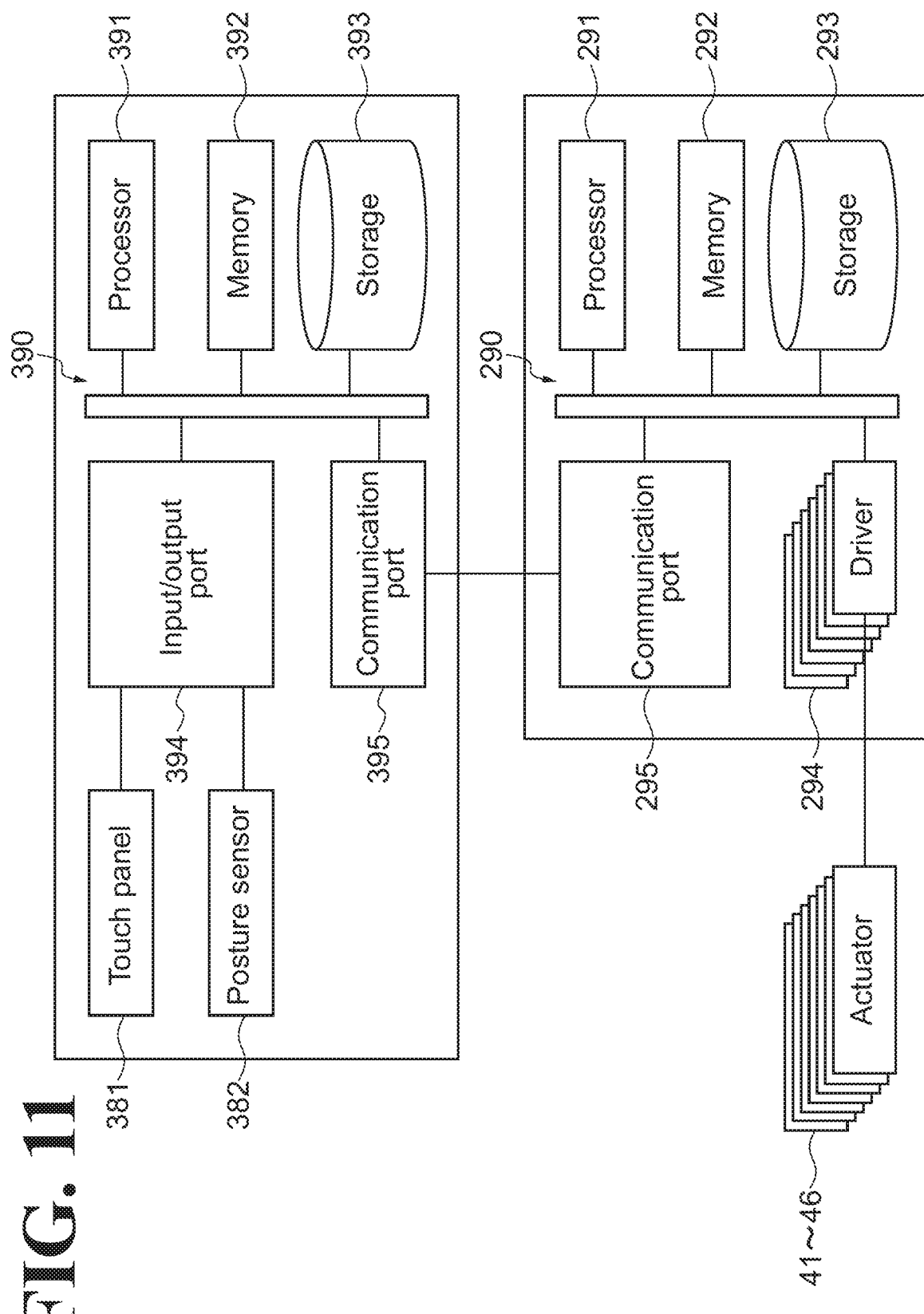
FIG. 11 is a block diagram illustrating a hardware configuration of the control system.

As illustrated in FIG. 11, the controller 200 includes circuitry 290. The circuitry 290 includes at least one processor 291, a memory 292, a storage 293, a driver 294, and a communication port 295. The storage 293 is a computer-readable non-volatile storage medium (non-limiting examples include a hard disc and a flash memory). The storage 293 stores programs for implementing the functional modules of the controller 200. The memory 292 temporarily stores programs loaded from the storage 293 and stores results of operations performed by the processor 291. The processor 291 cooperates with the memory 292 to execute the programs, thereby implementing the functional modules of the controller 200. The driver 294, at a command from the processor 291, outputs drive power to the actuators 41 to 46. The communication port 295, at a command from the processor 291, performs network communication with the operation device 300.

The operation device 300 includes the touch panel 381, the posture sensor 382, and circuitry 390. The circuitry 390 includes at least one processor 391, a memory 392, a storage 393, an input/output port 394, and a communication port 395. The storage 393 is a computer-readable non-volatile storage medium (a non-limiting example is a flash memory).

The storage 393 stores a program for causing the operation device 300 to perform a control method including: outputting screen data to the operation input part 311 so that the operation input part 311 displays an operation screen including at least one operation image 512; detecting the posture of the operation input part 311 in the first coordinate system C1, which is used to control the robot 10; turning the second coordinate system C2, which is turnable relative to the first coordinate system C1, based on the posture of the operation input part 311; upon execution of a point operation of specifying at least one point on the operation image 512, determining the motion direction of the leading end 12 in the second coordinate system C2 such that the motion direction is correlated with a positional relationship between the one point and the reference point 531 in the operation image 512 and/or a positional relationship between the one point and the reference point 542 in the operation image 512, determining the motion scalar quantity by which the leading end 12 moves such that the motion scalar quantity is correlated with the distance between the one point and the reference point 531 and the distance between the one point and the reference point 542, and generating a motion command for the leading end 12 such that the motion command includes the motion direction and the motion scalar quantity; converting the motion command for the leading end 12 into a first-coordinate-system motion command for the leading end 12 in the first coordinate system C1; and outputting a control command for controlling the robot 10 based on the first-coordinate-system motion command.

The storage 393 may store a program for causing the operation device 300 to perform a control method including: detecting the posture of the operation input part 311 in the first coordinate system C1, which is used to control the robot 10; turning the second coordinate system C2, which is turnable relative to the first coordinate system C1, based on the posture of the operation input part 311; based on an operation input into the operation input part 311, generating a motion command for the leading end 12 in the second coordinate system C2; converting the motion command for the leading end 12 in the second coordinate system C2 into a first-coordinate-system motion command for the leading end 12 in the first coordinate system C1; outputting a control command for controlling the robot 10 based on the first-coordinate-system motion command; and regulating the turning of the second coordinate system C2 about at least one axis. The storage 393 stores programs for implementing the functional modules of the operation device 300.

The memory 392 temporarily stores programs loaded from the storage 393 and stores results of operations performed by the processor 391. The processor 391 cooperates with the memory 392 to execute the programs, thereby implementing the functional modules of the operation device 300. The input/output port 394, at a command from the processor 391, obtains signals from the touch panel 381 and the posture sensor 382, and outputs the signals to the touch panel 381. The communication port 395, at a command from the processor 291, performs network communication with the controller 200.

Control Procedure

Description will be made with regard to, as an example of the control method, a procedure for control performed by the control system 100. This control procedure includes: detecting the posture of the operation input part 311 in the first coordinate system C1, which is used to control the robot 10; turning the second coordinate system C2, which is turnable relative to the first coordinate system C1, based on the posture of the operation input part 311; upon execution of a point operation of specifying at least one point on the operation image 512, determining the motion direction of the leading end 12 in the second coordinate system C2 such that the motion direction is correlated with a positional relationship between the one point and the reference point 531 in the operation image 512 and/or a positional relationship between the one point and the reference point 542 in the operation image 512, determining the motion scalar quantity by which the leading end 12 moves such that the motion scalar quantity is correlated with the distance between the one point and the reference point 531 and the distance between the one point and the reference point 542, and generating a motion command for the leading end 12 such that the motion command includes the motion direction and the motion scalar quantity; converting the motion command for the leading end 12 into a first-coordinate-system motion command for the leading end 12 in the first coordinate system C1; and outputting a control command for controlling the robot 10 based on the first-coordinate-system motion command.

This control procedure may include: turning the second coordinate system C2, which is turnable relative to the first coordinate system C1, based on the posture of the operation input part 311; based on an operation input into the operation input part 311, generating a motion command for the leading end 12 in the second coordinate system C2; converting the motion command for the leading end 12 in the second coordinate system C2 into a first-coordinate-system motion command for the leading end 12 in the first coordinate system C1; outputting a control command for controlling the robot 10 based on the first-coordinate-system motion command; and regulating the turning of the second coordinate system C2 about at least one axis.

In the following description, for exemplary purposes, the control procedure is divided into: a screen data outputting procedure (procedure for outputting screen data of an operation screen); a control command outputting procedure in the movable coordinate system mode (procedure for outputting a control command from the operation device 300 to the controller 200); a calibration procedure (procedure for performing a calibration); and a procedure for performing control (procedure for performing control based on a control command).

Screen Data Outputting Procedure

Figure 12:
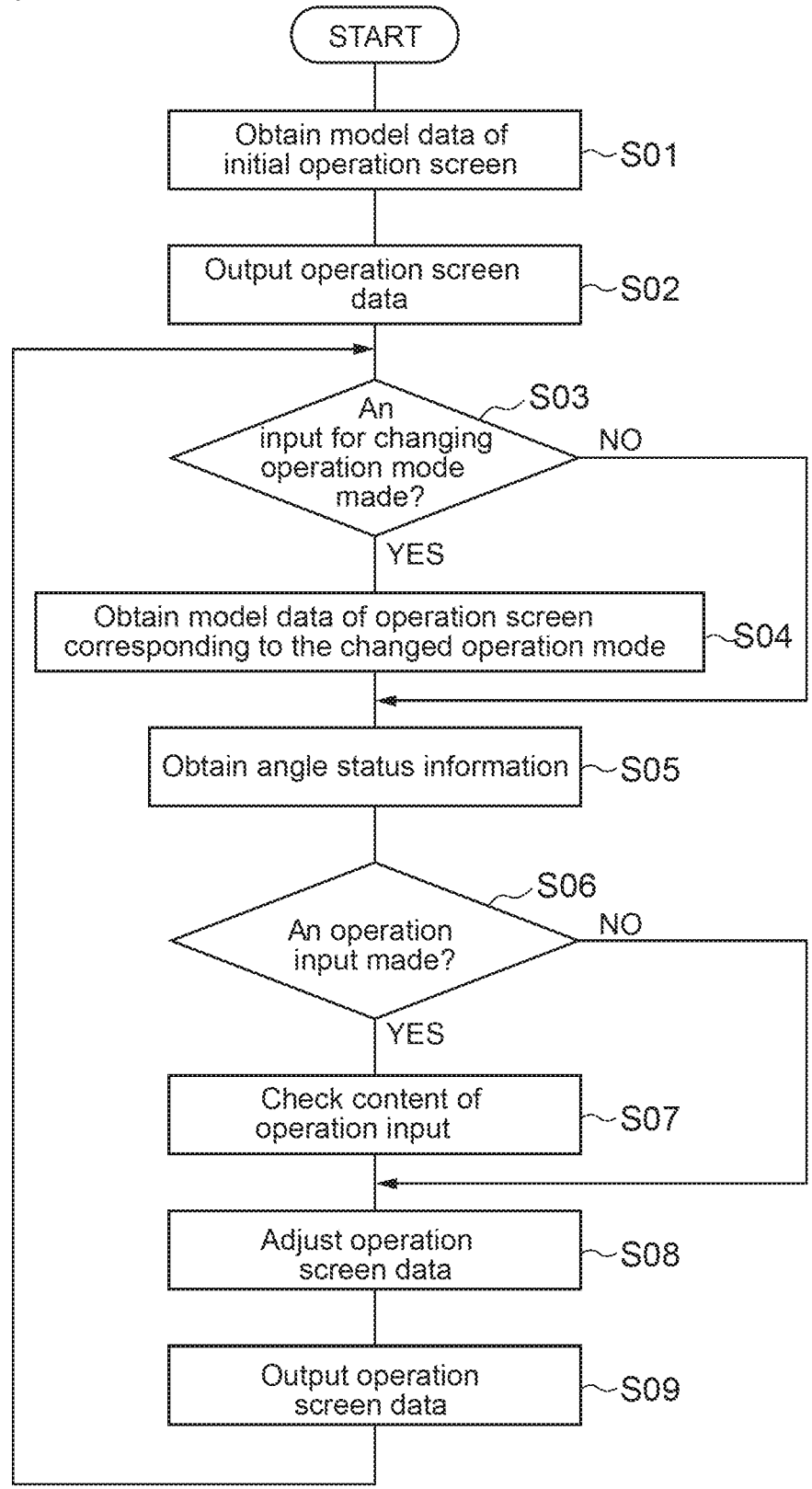
FIG. 12 is a flowchart of an example procedure for outputting screen data.

As illustrated in FIG. 12, the operation device 300 performs steps S01, S02, and S03. At step S01, the screen output part 313 obtains model data of an initial operation screen from the model data storage part 314. In this regard, which operation screen to use as the initial screen is set in advance. At step S02, the screen output part 313 outputs screen data to the operation input part 311 so that the operation input part 311 displays the operation screen. At step S03, the input content identification part 312 checks whether the operation input part 311 has received an operation input for changing the operation mode. Specifically, the input content identification part 312 checks whether there has been a point operation of pressing the input mode switch button 411 or 515.

When at step S03 there has been an operation input for changing the operation mode, the operation device 300 performs step S04. At step S04, the screen output part 313 obtains model data of an operation screen corresponding to the changed operation mode.

Next, the operation device 300 performs steps S05 and S06. When at step S03 there has been no operation input for changing the operation mode, the operation device 300 performs steps S05 and S06 without performing step S04. At step S05, the angle information obtaining part 316 obtains status information indicating the current angles of the joints 31, 32, 33, 34, 35, and 36 from the control execution part 214 of the controller 200. At step S06, the input content identification part 312 checks whether there has been an operation input on the operation screens 400 and 500.

When at step S06 there has been an operation input on the operation screens 400 and 500, the operation device 300 performs step S07. At step S07, the input content identification part 312 checks the content of the operation input that has been made. Specifically, when the position specified by the point operation coincides with the position of any one point area in the operation image 512, the input content identification part 312 determines that an operation of specifying the point area has been made. Then, the input content identification part 312 stores the determination result in the input content storage part 317.

Next, the operation device 300 performs steps S08 and S09. When at step S06 there has been no operation input of pressing the operation screen 400 or 500, the operation device 300 performs steps S08 and S09 without performing step S07. At step S08, the screen output part 313 adjusts the screen data of the operation screen based on information such as: the state of the operation input that has been made in the operation input part 311; and status information indicating the current angles of the joints 31, 32, 33, 34, 35, and 36. Specifically, the screen output part 313 highlights a particular portion (for example, a point area) of the operation screen corresponding to the point operation. Also, the screen output part 313 updates the data displayed on the angle indicator 513 based on the status information indicating the current angles of the joints 31, 32, 33, 34, 35, and 36. At step S09, the screen output part 313 outputs the screen data of the operation screen to the operation input part 311. Then, the operation device 300 returns the processing to step S03. Later on, whether there has been an operation input into the operation input part 311 is continuously monitored so that the screen output part 313 outputs screen data of an operation screen to the operation input part 311 upon execution of an operation input.

Control Command Outputting Procedure

Figure 13:
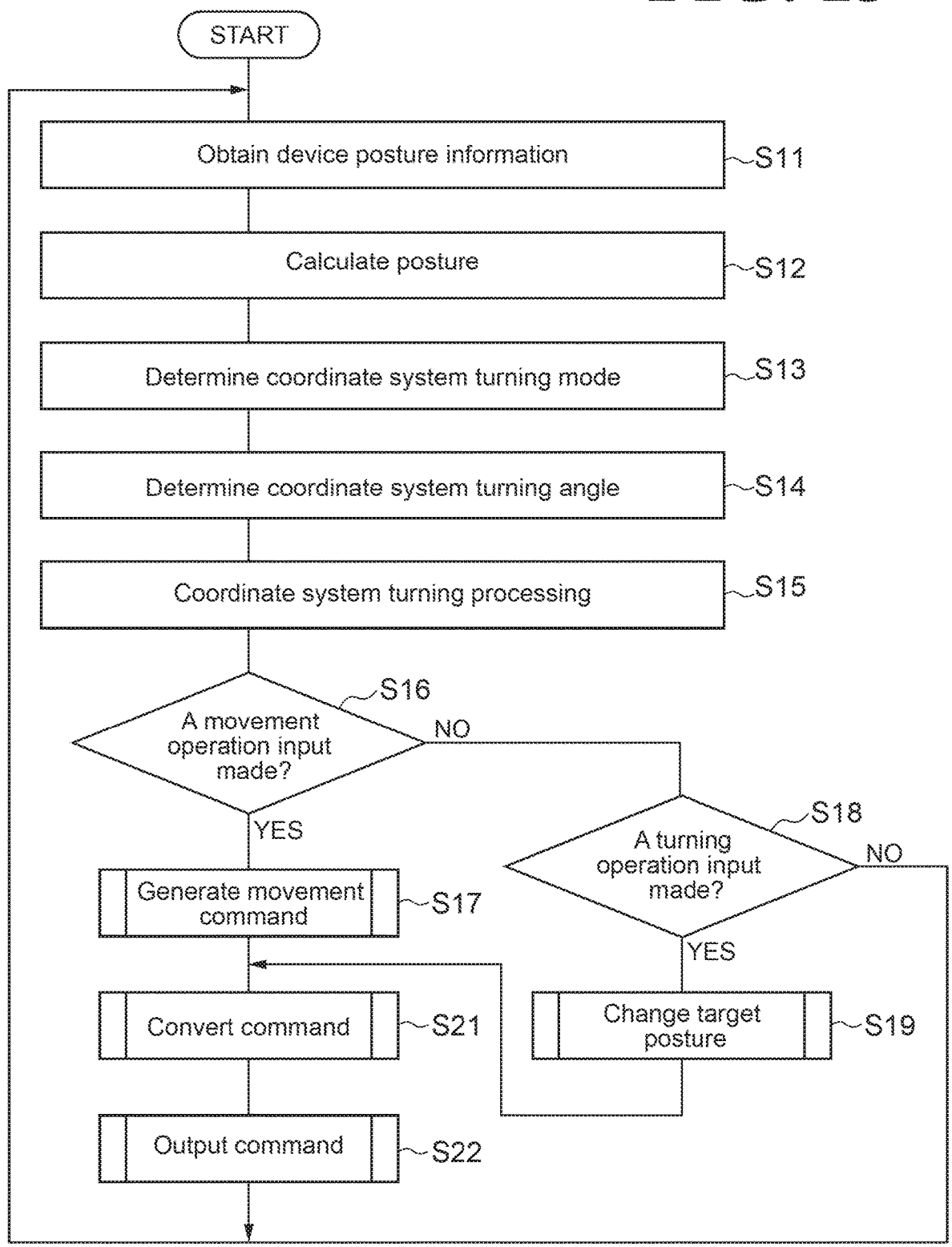
FIG. 13 is a flowchart of an example procedure for operation control.

As illustrated in FIG. 13, the operation device 300 performs steps S11, S12, S13, S14, S15, and S16. At step S11, the posture calculation part 322 obtains, from the device posture detection part 321, information indicating the posture of the operation input part 311 in the first coordinate system C1. At step S12, the posture calculation part 322 calculates the posture of the operation input part 311 based on the information obtained from the device posture detection part 321. At step S13, the mode switch part 325 switches between the regulation mode and the free mode based on the input on the regulation mode setting image 511. At step S14, the coordinate system turning regulation part 324, according to the regulation mode, determines the turning angle of the second coordinate system C2 to regulate the turning of the second coordinate system C2. For example, when the first regulation mode has been chosen, the coordinate system turning regulation part 324 sets the turning angles of the second coordinate system C2 about the X axis C11 and the Y axis C12 at zero angles, and sets the turning angle of the operation input part 311 about the Z axis C13 calculated by the posture calculation part 322 at the turning angle of the second coordinate system C2 about the Z axis C13. At step S15, the coordinate system turning part 323 performs coordinate system turning processing of turning the second coordinate system C2 based on the turning angles determined by the coordinate system turning regulation part 324. At step S16, the command generation part 330 check whether there has been an operation input on the first movement tool image 521 or the second movement tool image 522.

When at step S16 there has been an operation input on the first movement tool image 521 or the second movement tool image 522, the operation device 300 performs step S17. At step S17, the first movement command generation part 331 or the second movement command generation part 332 generates a movement command for the leading end 12 in the second coordinate system C2. Details of the processing at step S17 will be described later.

When at step S16 there has been no operation input on the first movement tool image 521 or the second movement tool image 522, the operation device 300 performs step S18. At step S18, the command generation part 330 checks whether there has been an operation input on the first turning tool image 523 or the second turning tool image 524.

When at step S18 there has been an operation input on the first turning tool image 523 or the second turning tool image 524, the operation device 300 performs step S19. At step S19, the first turning command generation part 333 or the second turning command generation part 334 determines the turning direction of the leading end 12. Details of the processing at step S19 will be described later.

After step S17 or step S19, the operation device 300 performs steps S21 and S22. At step S21, the command conversion part 341 converts the motion command for the leading end 12 in the second coordinate system C2 generated at step S17 or step S19 into a first-coordinate-system motion command for the leading end 12 in the first coordinate system C1. At step S22, the command output part 342 outputs the first-coordinate-system motion command (for the leading end 12 in the first coordinate system C1) obtained at step S21.

After step S22, the operation device 300 returns the processing to step S11. The operation device 300 also returns the processing to step S11 when there has been no operation input at step S18. Later on, whether there has been an operation input on the first movement tool image 521, the second movement tool image 522, the first turning tool image 523, and the second turning tool image 524 is continuously monitored so that the operation device 300 outputs a control command to the controller 200 upon execution of an operation input.

Figure 14:
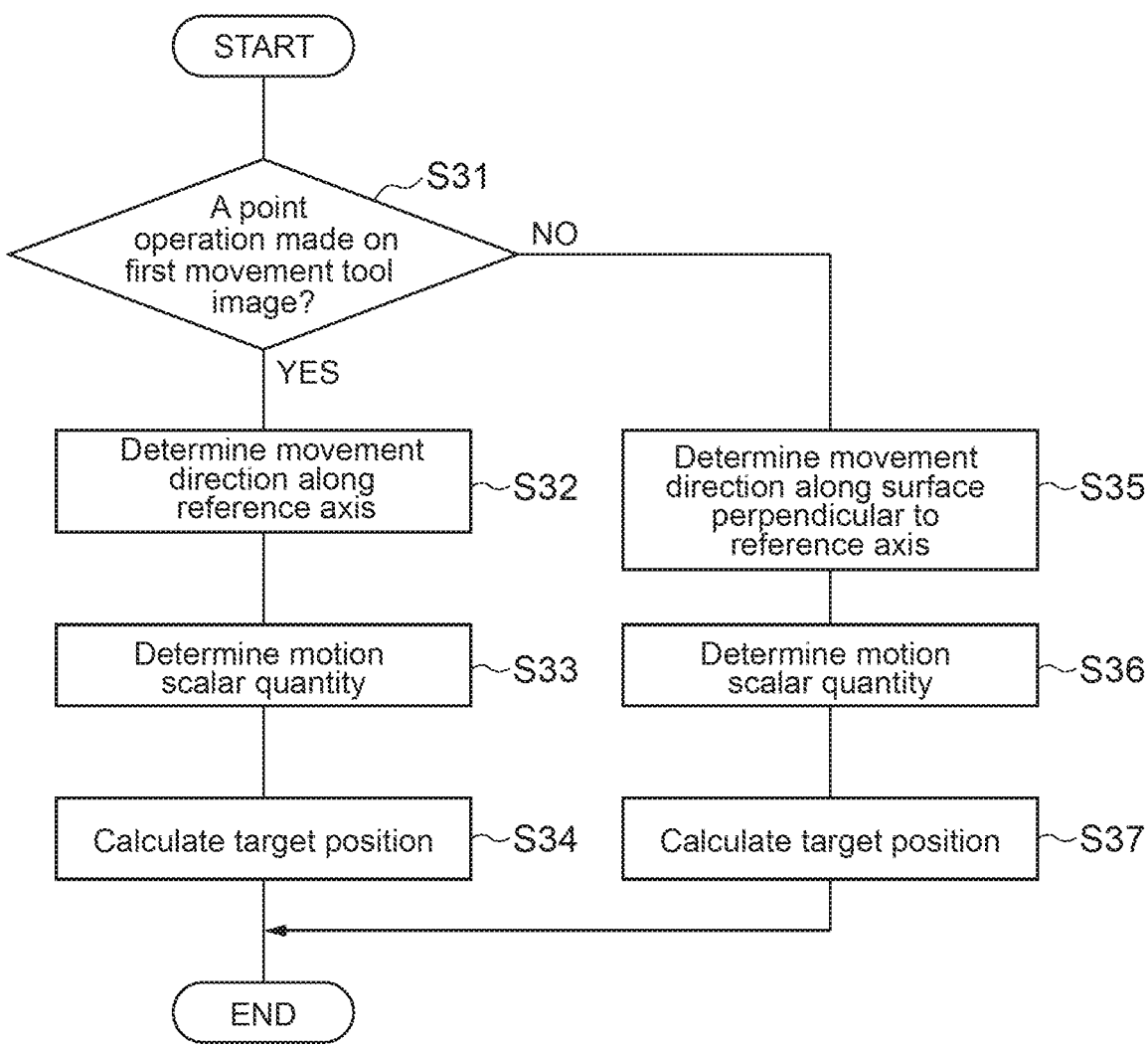
FIG. 14 is a flowchart of an example procedure for movement command generation.

Next, an example procedure for generating the movement command at step S17 will be described. As illustrated in FIG. 14, the operation device 300 performs step S31. At step S31, the command generation part 330 check whether there has been a point operation on the first movement tool image 521.

When at step S31 there has been a point operation on the first movement tool image 521, the operation device 300 performs steps S32, S33, and S34. At step S32, the first movement command generation part 331 determines the movement direction of the leading end 12 as a direction along the reference axis RL. For example, when the point area 533A or 533B has been specified by a point operation, the first movement command generation part 331 determines the movement direction of the leading end 12 as the positive direction of the Z axis C23. When the point area 534A or 534B has been specified by a point operation, the first movement command generation part 331 determines the movement direction of the leading end 12 as the negative direction of the Z axis C23. At step S33, the first movement command generation part 331 determines the motion scalar quantity by which the leading end 12 moves. For example, when the point area 533B or 534B has been specified by a point operation, the first movement command generation part 331 determines the motion scalar quantity as a higher value than when the point area 533A or 534A has been specified. At step S34, the first movement command generation part 331 calculates a post-movement target position of the leading end 12 based on the movement direction determined at step S32 and based on the motion scalar quantity determined at step S33.

When at step S31 there has been a point operation on the second movement tool image 522 (instead of the first movement tool image 521), the operation device 300 performs step S35. At step S35, the second movement command generation part 332 determines the movement direction of the leading end 12 along a surface perpendicular to the reference axis RL. For example, when the point area 543A, 543B, or 543C has been specified by a point operation, the second movement command generation part 332 determines the movement direction of the leading end 12 as the positive direction of the X axis C21. When the point area 544A, 544B, or 544C has been specified by a point operation, the second movement command generation part 332 determines the movement direction of the leading end 12 as the negative direction of the X axis C21. When the point area 553A, 553B, or 553C has been specified by a point operation, the second movement command generation part 332 determines the movement direction of the leading end 12 as the positive direction of the Y axis C22. When the point area 554A, 554B, or 554C has been specified by a point operation, the second movement command generation part 332 determines the movement direction of the leading end 12 as the negative direction of the Y axis C22.

Next, the operation device 300 performs steps S36 and S37. At step S36, the second movement command generation part 332 determines the motion scalar quantity by which the leading end 12 moves. For example, the point areas 543B and 544B are farther away from the reference point 542 than the point areas 543A and 544A are from the reference point 542, and when the point area 543B or 544B has been specified, the second movement command generation part 332 determines the motion scalar quantity as a higher value than when the point area 543A or 544A has been specified. The point areas 543C and 544C are farther away from the reference point 542 than the point areas 543B and 544B are from the reference point 542, and when the point area 543C or 544C has been specified, the second movement command generation part 332 determines the motion scalar quantity as an even higher value than when the point area 543B or 544B has been specified. At step S37, the second movement command generation part 332 calculates a post-movement target position of the leading end 12 based on the movement direction determined at step S35 and based on the motion scalar quantity determined at step S36. Upon completion of step S34 or step S37, the operation device 300 ends the procedure for generating a movement command.

Figure 15:
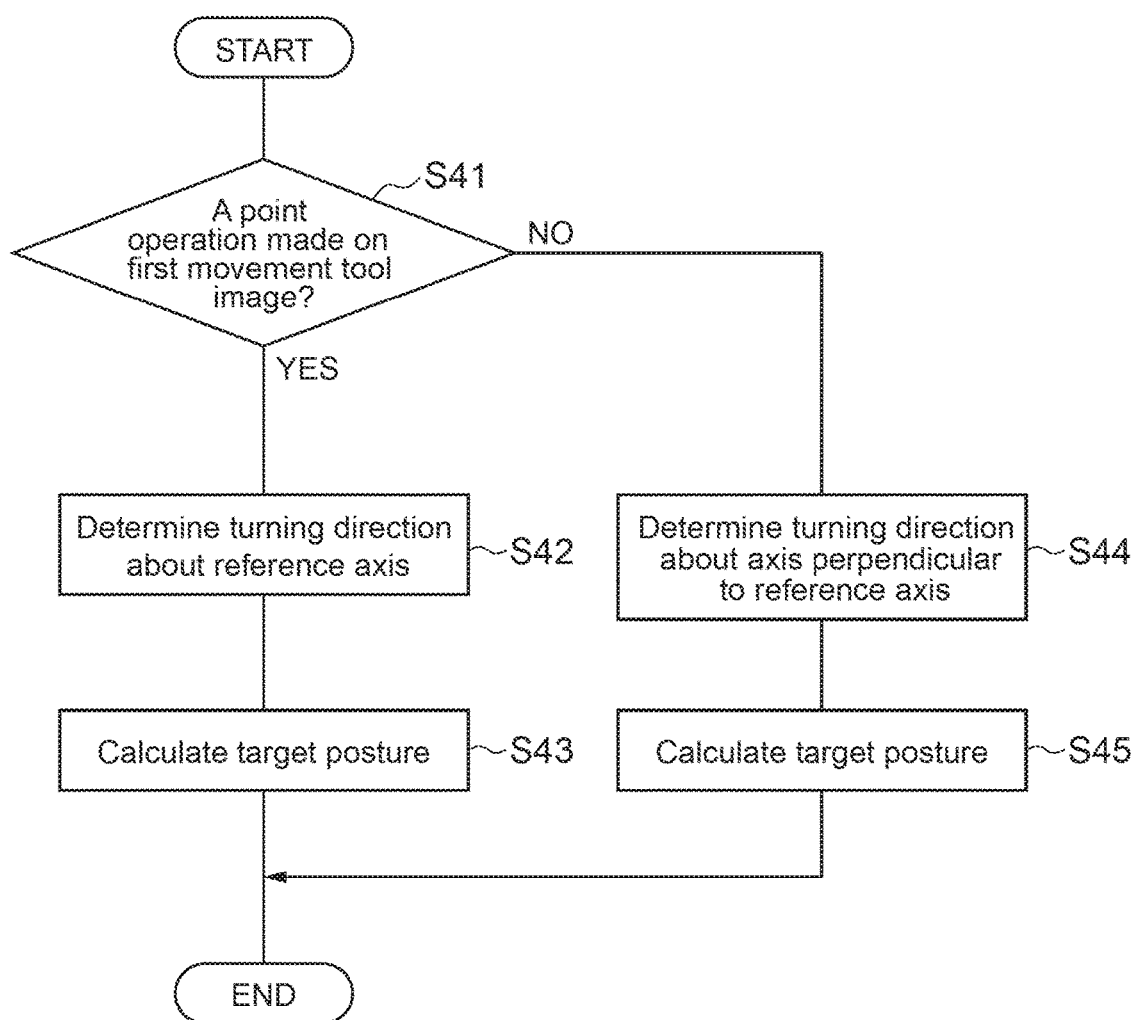
FIG. 15 is a flowchart of an example procedure for rotation command generation.

Next, an example procedure for generating a turning command at step S19 will be described. As illustrated in FIG. 15, the operation device 300 performs step S41. At step S41, the command generation part 330 checks whether there has been a point operation on the first turning tool image 523.

When at step S41 there has been a point operation on the first turning tool image 523, the operation device 300 performs steps S42 and S43. At step S42, the first turning command generation part 333 determines the turning direction of the leading end 12 about the reference axis RL. For example, when one point in the uni-axis operation system 570 has been specified, the first turning command generation part 333 determines the turning direction of the leading end 12 about the movement line ML3, which corresponds to the uni-axis operation system 570, based on whether the point area 571 or 572 has been specified. At step S43, the first turning command generation part 333 calculates a post-turning target position of the leading end 12 based on the turning direction determined at step S42.

When at step S41 there has been a point operation on the second turning tool image 524 (instead of the first turning tool image 523), the operation device 300 performs steps S44 and S45. At step S44, the second turning command generation part 334 determines the turning direction of the leading end 12 about an axis orthogonal to the reference axis RL. For example, when one point in the uni-axis operation system 580 has been specified, the second turning command generation part 334 determines the turning direction of the leading end 12 about the movement line ML1, which corresponds to the uni-axis operation system 580, based on whether the point area 581 or 582 has been specified. When one point in the uni-axis operation system 590 has been specified, the second turning command generation part 334 determines the turning direction of the leading end 12 about the movement line ML2, which corresponds to the uni-axis operation system 590, based on whether the point area 591 or 592 has been specified. At step S45, the second turning command generation part 334 calculates a post-turning target position of the leading end 12 based on the turning direction determined at step S44. Upon completion of step S43 or step S45, the operation device 300 ends the procedure for generating a turning command for the leading end 12.

Calibration Procedure

Figure 16:
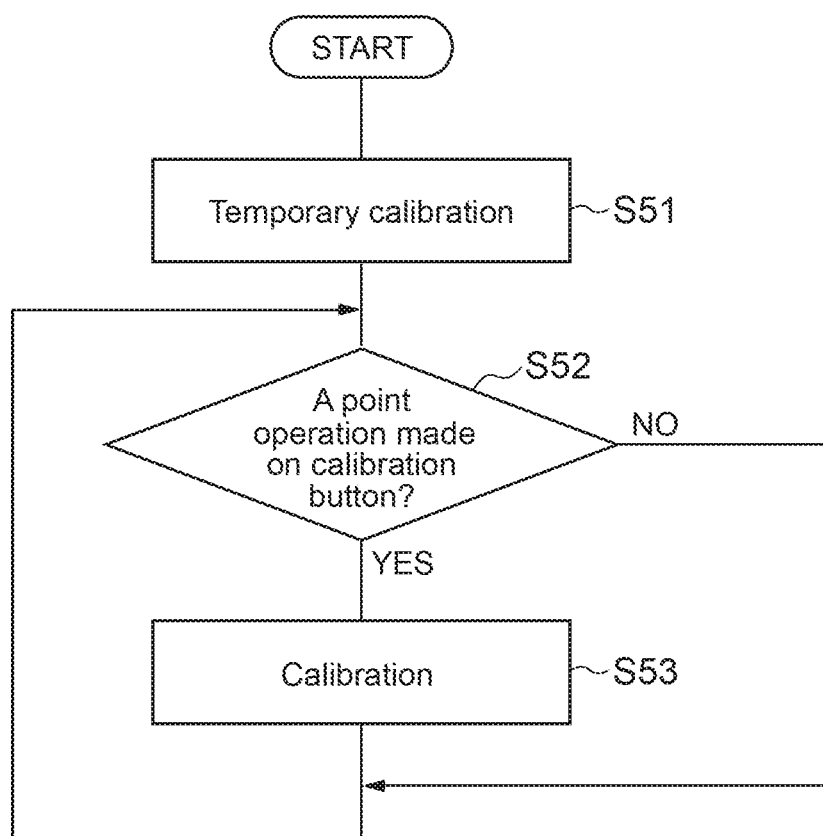
FIG. 16 is a flowchart of an example calibration procedure.

As illustrated in FIG. 16, the operation device 300 performs steps S51 and S52. At step S51, at the time of activation of the robot system 1, the unsetting notification part 352 sets the posture of the second coordinate system C2 at an initial posture. In other words, the unsetting notification part 352 performs a temporary calibration. At step S52, the calibration part 351 checks whether there has been a point operation on the calibration button 514.

When at step S52 there has been a point operation on the calibration button 514. The operation device 300 performs step S53. At step S53, the calibration part 351 performs a calibration. That is, the calibration part 351 sets the posture of the second coordinate system C2 relative to the first coordinate system C1 at a preset initial posture. Specifically, the calibration part 351 makes the X axis C21, the Y axis C22, and the Z axis C23 respectively coincide with the X axis C11, the Y axis C12, and the Z axis C13.

After step S53, the operation device 300 returns the processing to step S52. The operation device 300 also returns the processing to step S52 when at step S52 the calibration part 351 has determined that there has been no point operation on the calibration button 514. Later on, the operation device 300 continuously monitors whether there has been a point operation on the calibration button 514 so that the operation device 300 performs a calibration upon execution of a point operation on the calibration button 514.

Procedure for Performing Control

Figure 17:
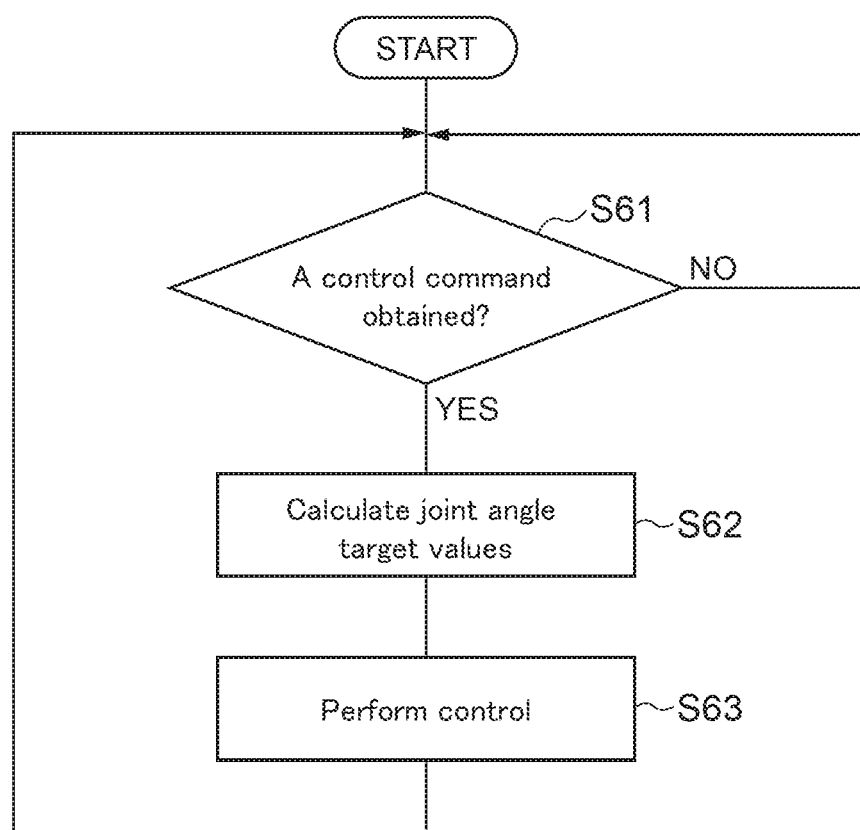
FIG. 17 is a flowchart of an example procedure for performing control.

As illustrated in FIG. 17, the controller 200 performs steps S61, S62, and S63. At step S61, the inverse kinematics operation part 213 waits for a control command to be obtained from the command output part 342 of the operation device 300. At step S62, based on the target position and the target posture of the leading end 12 specified by the control command, the inverse kinematics operation part 213 performs an inverse kinematics operation to calculate joint angle target values for moving the leading end 12. At step S63, the control execution part 214 controls the robot 10 to drive the joints 31, 32, 33, 34, 35, and 36 based on the joint angle target values using the actuators 41, 42, 43, 44, 45, and 46. Later on, the controller 200 calculates joint angle target values upon receipt of a control command from the operation device 300, and controls the robot 10 based on the joint angle target values.

Advantageous Effects of this Embodiment

As has been described hereinbefore, the operation device 300 includes the operation input part 311, the screen output part 313, the device posture detection part 321, the coordinate system turning part 323, the command generation part 330, the command conversion part 341, and the command output part 342. Through the operation input part 311, the robot 10 is operated. The robot 10 includes the leading end 12, the base 11, and the multi-articular arm 20. The multi-articular arm 20 changes the position and the posture of the leading end 12 relative to the base 11. The screen output part 313 outputs screen data to the operation input part 311 so that the operation input part 311 displays the operation screens 500, 501, 502, and 503, each of which includes at least one operation image 512. The operation image 512 is used to input a motion command for the leading end 12. The device posture detection part 321 detects the posture of the operation input part 311 in the first coordinate system C1, which is used to control the robot 10. Based on the posture of the operation input part 311, the coordinate system turning part 323 turns the second coordinate system C2, which is turnable relative to the first coordinate system C1. Upon execution of a point operation of specifying at least one point on the operation image 512, the command generation part 330 determines the motion direction of the leading end 12 in the second coordinate system C2 such that the motion direction is correlated with a positional relationship between the one point and the reference point 531 in the operation image 512 and/or a positional relationship between the one point and the reference point 542 in the operation image 512; determines the motion scalar quantity by which the leading end 12 moves such that the motion scalar quantity is correlated with the distance between the one point and the reference point 531 and the distance between the one point and the reference point 542; and generates a motion command for the leading end 12 such that the motion command includes the motion direction and the motion scalar quantity. The command conversion part 341 converts the motion command for the leading end 12 into a first-coordinate-system motion command for the leading end 12 in the first coordinate system C1. The command output part 342 outputs a control command for controlling the robot 10 based on the first-coordinate-system motion command.

The command generation part 330 determines both the movement direction and the motion scalar quantity based on the position of a point specified by a point operation (this point will be hereinafter referred to as "specified point"). With the configuration described so far, the operation device 300 effectively improves manipulability associated with teaching of robots. In the above-described configuration, the movement direction is set such that the movement direction is correlated with a positional relationship between the specified point and the reference point 531 and/or a positional relationship between the specified point and the reference point 542. Also, the motion scalar quantity is set such that the motion scalar quantity is correlated with the distance between the specified point and the reference point 531 and/or the distance between the specified point and the reference point 542. This enables the operator to more intuitively understand how the movement direction and the motion scalar quantity are set. Thus, the above-described configuration is effective for a further improvement of manipulability associated with teaching of robots. It is to be noted that an input by a point operation minimizes the discrepancy between the content of input intended by the operator and the content that has actually been input, as compared with an input by a slide operation. This configuration is effective for improving manipulability associated with teaching of robots. It is to be noted that the motion scalar quantity may include the speed at which the leading end 12 moves.

The at least one operation image 512 may include the first movement tool image 521 and the second movement tool image 522. On the first movement tool image 521 and the second movement tool image 522, a command for moving the leading end 12 is input. The first movement tool image 521 may include at least one one-dimensional operation systems 530. The one-dimensional operation systems 530 is drawn along the one drawn line 532. The second movement tool image 522 may include at least one one-dimensional operation system 540 or 550. The one-dimensional operation system 540 is drawn along the one drawn line 541, and the one-dimensional operation system 550 is drawn along the one drawn line 551. The one-dimensional operation system 530 corresponds to the movement line ML3, which is set in the second coordinate system C2; the one-dimensional operation system 540 corresponds to the movement line ML1, which is set in the second coordinate system C2; and the one-dimensional operation system 550 corresponds to the movement line ML2, which is set in the second coordinate system C2. The command generation part 330 may include the first movement command generation part 331 and the second movement command generation part 332. Based on an input the first movement tool image 521 and the second movement tool image 522, the first movement command generation part 331 and the second movement command generation part 332 generate a movement command for the leading end 12 in the second coordinate system C2. Upon execution of a point operation of specifying at least one point in the one-dimensional operation system, the first movement command generation part 331 and the second movement command generation part 332 may: determine the movement direction of the leading end 12 such that the movement direction is correlated with a positional relationship between the one point and the reference point 531 of the one-dimensional operation system 530 on the movement line ML3, which corresponds to the one-dimensional operation system 530, such that the movement direction is correlated with a positional relationship between the one point and the reference point 542 of the one-dimensional operation system 540 on the movement line ML1, which corresponds to the one-dimensional operation system 540, and such that the movement direction is correlated with a positional relationship between the one point and the reference point 542 of the one-dimensional operation system 550 on the movement line ML2, which corresponds to the one-dimensional operation system 550; determine the motion scalar quantity of the leading end 12 such that the motion scalar quantity is correlated with the distance between the one point and the reference point 531, and such that the motion scalar quantity is correlated with the distance between the one point and the reference point 542; and generate a movement command for the leading end 12 such that the movement command includes the movement direction and the motion scalar quantity. Thus, the one-dimensional operation system 530 of the operation image 512 corresponds to the movement line ML3 in the second coordinate system C2, the one-dimensional operation system 540 of the operation image 512 corresponds to the movement line ML1 in the second coordinate system C2, and the one-dimensional operation system 550 of the operation image 512 corresponds to the movement line ML2 in the second coordinate system C2. This enables the operator to clearly recognize the direction in which the leading end 12 is moving.

The second movement tool image 522 may include at least one one-dimensional operation system 540 or 550. The one-dimensional operation systems 540 and 550 are respectively drawn along the drawn lines 541 and 551, which cross each other. The one-dimensional operation systems 540 and 550 respectively correspond to the movement lines ML1 and ML2, which cross each other in the second coordinate system C2. Upon execution of a point operation of specifying at least one point in one of the one-dimensional operation systems 540 and 550, the second movement command generation part 332 may: determine the movement direction such that the movement direction is correlated with a positional relationship between the one point and the reference point 542 of the one-dimensional operation system 540 or 550 on the movement line ML1 or ML2, which respectively correspond to the one-dimensional operation systems 540 and 550; and determine the motion scalar quantity such that the motion scalar quantity is correlated with the distance between the one point and the reference point 542. This enables the operator to clearly recognize the direction in which the leading end 12 is moving while ensuring that a wider variety of movement directions can be specified on one operation image 512.

The at least one one-dimensional operation system 530 may include the plurality of point areas 533A, 533B, 534A, and 534B. The point areas 533A, 533B, 534A, and 534B are aligned in an order from the reference point 531. The at least one one-dimensional operation system 540 may include the plurality of point areas 543A, 543B, 543C, 544A, 544B, and 544C. The point areas 543A, 543B, 543C, 544A, 544B, and 544C are aligned in an order from the reference point 542. The at least one one-dimensional operation system 550 may include the plurality of point areas 553A, 553B, 553C, 554A, 554B, and 554C. The point areas 553A, 553B, 553C, 554A, 554B, and 554C are aligned in an order from the reference point 542. Upon execution of a point operation of specifying any one point area in the one-dimensional operation systems 530, 540, and 550, the first movement command generation part 331 and the second movement command generation part 332 may: determine the movement direction such that the movement direction is correlated with a positional relationship between the point area and the reference point 531 on the movement line ML3, which corresponds to the one-dimensional operation system 530, such that the movement direction is correlated with a positional relationship between the point area and the reference point 542 on the movement line ML1, which corresponds to the one-dimensional operation system 540, and such that the movement direction is correlated with a positional relationship between the point area and the reference point 542 on the movement line ML2, which corresponds to the one-dimensional operation system 550; determine the motion scalar quantity such that the motion scalar quantity is correlated with the distance between the point area and the reference point 531, and such that the motion scalar quantity is correlated with the distance between the point area and the reference point 542. Thus, a point operation is performed on a point-area basis. This prevents operation inputs from varying, which can otherwise occur due to the variable nature of point operation positions. This, as a result, further improves manipulability associated with teaching of robots.

The at least one one-dimensional operation system 530 may include the dead areas 535 between the point areas 533A, 533B, 534A, and 534B. In the dead areas 535, point operations are disregarded. The at least one one-dimensional operation system 540 may include the dead areas 545 between the point areas 543A, 543B, 543C, 544A, 544B, and 544C. In the dead areas 545, point operations are disregarded. The at least one one-dimensional operation system 550 may include the dead areas 555 between the point areas 553A, 553B, 553C, 554A, 554B, and 554C. In the dead areas 555, point operations are disregarded. Thus, the dead areas 535, 545, and 555 are provided between the point areas. This eliminates or minimizes erroneous choosing of point areas, resulting in a further improvement of manipulability associated with teaching of robots.

The widths W1 of the point areas 533A and 534A and the widths W2 of the point areas 533B and 534B may increase as the point areas are farther away from the reference point 531. The widths W11 of the point areas 543A and 544A, the widths W12 of the point areas 543B and 544B, and the widths W13 of the point areas 543C and 544C may increase as the point areas are farther away from the reference point 542. The widths W21 of the point areas 553A and 554A, the widths W22 of the point areas 553B and 554B, and the widths W23 of the point areas 553C and 554C may increase as the point areas are farther away from the reference point 542. This enables the operator to more intuitively recognize the point areas in relation to their scalar quantities.

The at least one operation image 512 may further include the first turning tool image 523 and the second turning tool image 524. On the first turning tool image 523 and the second turning tool image 524, a turning command for the leading end 12 is input. The command generation part 330 may further include the first turning command generation part 333 and the second turning command generation part 334. The first turning command generation part 333 and the second turning command generation part 334 generate, based on an input on the first turning tool image 523 and the second turning tool image 524, a turning command for the leading end 12 in the second coordinate system C2. This ensures that the posture of the leading end 12 as well can be specified in the second coordinate system C2. Thus, this configuration is effective for a further improvement of manipulability associated with teaching of robots.

The multi-articular arm 20 may include the plurality of joints 31, 32, 33, 34, 35, and 36. The screen output part 313 may output screen data to the operation input part 311 so that the operation input part 311 displays operation screens 500, 501, 502, and 503. The operation screens 500, 501, 502, and 503 each include the angle indicator 513. The angle indicator 513 indicates a combination of an angle status and an angle limit of each of the plurality of joints 31, 32, 33, 34, 35, and 36. This provides the operator with a knowledge of the movable limit of the robot 10 in making an operation. Thus, this configuration is effective for a further improvement of manipulability associated with teaching of robots.

The operation device 300 may further include the calibration part 351 and the unsetting notification part 352. The calibration part 351 performs, based on an input into the operation input part 311, a calibration of setting the posture of the second coordinate system C2 relative to the first coordinate system C1 at a preset initial posture. The unsetting notification part 352 notifies that no calibration has been performed by the calibration part 351. This more reliably provides the operator with a manipulability that is adapted to the sense of orientation of the operator.

The operation device 300 includes the operation input part 311, the device posture detection part 321, the coordinate system turning part 323, the command generation part 330, the command conversion part 341, the command output part 342, and the coordinate system turning regulation part 324. Through the operation input part 311, the robot 10 is operated. The robot 10 includes the leading end 12, the base 11, and the multi-articular arm 20. The multi-articular arm 20 changes the position and the posture of the leading end 12 relative to the base 11. The device posture detection part 321 detects the posture of the operation input part 311 in the first coordinate system C1, which is used to control the robot 10. Based on the posture of the operation input part 311, the coordinate system turning part 323 turns the second coordinate system C2, which is turnable relative to the first coordinate system C1. Based on an operation input into the operation input part 311, the command generation part 330 generates a motion command for the leading end 12 in the second coordinate system C2. The command conversion part 341 converts the motion command for the leading end 12 in the second coordinate system C2 into a first-coordinate-system motion command for the leading end 12 in the first coordinate system C1. The command output part 342 outputs a control command for controlling the robot 10 based on the first-coordinate-system motion command. The coordinate system turning regulation part 324 regulates the turning of the second coordinate system C2 about at least one axis.

With this configuration, the operation device 300 enables the operator to input a movement command for the leading end 12 in the second coordinate system C2, which is turnable based on the posture of the operation input part 311. This enables the operator to make an operation input that is adapted to the sense of orientation of the operator. Also in this above configuration, the turning direction of the second coordinate system C2 based on the posture of the operation input part 311 is limited. This eliminates or minimizes an excessive amount of turning of the second coordinate system C2. This, in turn, eliminates or minimizes the discrepancy between an operation input and the sense of orientation of the operator, which can otherwise be caused by an excessive amount of turning of the second coordinate system C2. Thus, the operation device 300 is effective for improving manipulability associated with teaching of robots.

The coordinate system turning regulation part 324 may regulate the turning of the second coordinate system C2 about an axis perpendicular to the reference axis RL, which extends in one direction, while allowing the turning of the second coordinate system C2 about the reference axis RL. This imposes an additional restriction on the operator in turning the second coordinate system C2 so that the second coordinate system C2 is prevented from turning excessively. Thus, this configuration is further effective for improving manipulability associated with teaching of robots.

The reference axis RL may be a vertical axis. A vertical direction can be universal in the sense of orientation of the operator, while the front and rear directions and the right and left directions can vary depending on the orientation of the operator. In light of the universal nature of a vertical direction, the reference axis RL is set at a vertical direction. This ensures an operation input that is more reliably adapted to the sense of orientation of the operator.

The operation device 300 may further include the screen output part 313. The screen output part 313 outputs screen data to the operation input part 311 so that the operation input part 311 displays the operation screens 500, 501, and 503. The operation screens 500, 501, and 503 include the first movement tool image 521 and the second movement tool image 522. On the first movement tool image 521, a command for moving the leading end 12 along the reference axis RL is input. On the second movement tool image 522, a command for moving the leading end 12 along a surface perpendicular to the reference axis RL is input. The command generation part 330 may include the first movement command generation part 331 and the second movement command generation part 332. Based on an operation input on the first movement tool image 521, the first movement command generation part 331 generates a movement command for the leading end 12 in the second coordinate system C2. Based on an operation input on the second movement tool image 522, the second movement command generation part 332 generates a movement command for the leading end 12 in the second coordinate system C2. In this case, the tool image is varied depending on whether the movement command is a movement command for a movement along an axis (the reference axis RL) that remains unchanged even if the posture of the operation input part 311 changes or a movement command for a movement along an axis that is turnable based on the posture of the operation input part 311. This ensures an operation input that is more reliably adapted to the sense of orientation of the operator.

Upon execution of a point operation of specifying at least one point on the first movement tool image 521, the first movement command generation part 331 may determine, based on the position of the one point on the first movement tool image 521, the movement direction in which the leading end 12 moves along the reference axis RL. Upon execution of a point operation of specifying at least one point on the second movement tool image 522, the second movement command generation part 332 may determine, based on the position of the one point on the second movement tool image 522, the movement direction in which the leading end 12 moves along a surface perpendicular to the reference axis RL. An input by a point operation minimizes the discrepancy between the content of input intended by the operator and the content that has actually been input, as compared with an input by a slide operation. Thus, this configuration is further effective for improving manipulability associated with teaching of robots. The above configuration also ensures that a one-dimensional operation input is used to input a movement command for a movement along the reference axis RL, and a two-dimensional operation input is used to input a movement command for a movement along a surface perpendicular to the reference axis RL. This ensures an input that is more reliably adapted to the sense of orientation of the operator.

The first movement tool image 521 may include the one-dimensional operation system 530. The one-dimensional operation system 530 is drawn along the one drawn line 532. The one-dimensional operation system 530 corresponds to the one movement line ML3, which is set along the reference axis RL in the second coordinate system C2. The second movement tool image 522 may include the one-dimensional operation systems 540 and 550. The one-dimensional operation systems 540 and 550 are respectively drawn along the drawn lines 541 and 551, which cross each other. The one-dimensional operation systems 540 and 550 respectively correspond to the movement lines ML1 and ML2, which cross each other on a surface perpendicular to the reference axis RL in the second coordinate system C2. Upon execution of a point operation of specifying at least one point in the one-dimensional operation system 530 of the first movement tool image 521, the first movement command generation part 331 may determine the movement direction based on the position of the one point on the movement line ML3, which corresponds to the one-dimensional operation system 530. Upon execution of a point operation of specifying at least one point in one of the one-dimensional operation systems 540 and 550 of the second movement tool image 522, the second movement command generation part 332 may determine the movement direction based on the position of the one point in the one-dimensional operation system 540 or 550 on the movement line ML1 or ML2, which respectively correspond to the one-dimensional operation systems 540 and 550. This enables the operator to more clearly recognize the movement direction of the leading end 12 on a surface perpendicular to the reference axis RL based on an operation input.

The operation screen 503 may further include the quantity setting tool image 610. The quantity setting tool image 610 specifies the motion scalar quantity included in the movement command. The first movement command generation part 331 and the second movement command generation part 332 may determine the motion scalar quantity included in the movement command based on an input on the quantity setting tool image 610. Thus, the motion scalar quantity is input on an operation image different from the operation image 512. This prevents an excessive scalar quantity from being input.

The operation screen 502 may further include the first turning tool image 523 and the second turning tool image 524. On the first turning tool image 523 and the second turning tool image 524, a turning command for the leading end 12 is input. The command generation part 320 may further include the first turning command generation part 333 and the second turning command generation part 334. Based on an input on the first turning tool image 523 and the second turning tool image 524, the first turning command generation part 333 and the second turning command generation part 334 may generate a turning command for the leading end 12 in the second coordinate system C2. This ensures that the posture of the leading end 12 as well can be specified in the second coordinate system C2. Thus, this configuration is effective for a further improvement of manipulability associated with teaching of robots.

The multi-articular arm 20 may include the plurality of joints 31, 32, 33, 34, 35, and 36. The screen output part 313 may output screen data to the operation input part 311 so that the operation input part 311 displays operation screens 500, 501, 502, and 503. The operation screens 500, 501, 502, and 503 each include the angle indicator 513. The angle indicator 513 indicates a combination of an angle status and an angle limit of each of the plurality of joints 31, 32, 33, 34, 35, and 36. This provides the operator with a knowledge of the movable limit of the robot 10 in making an operation. Thus, this configuration is effective for a further improvement of manipulability associated with teaching of robots.

The operation device 300 may further include the mode switch part 325. The mode switch part 325 switches between the regulation mode and the free mode. In the regulation mode, the coordinate system turning regulation part 324 regulates the turning of the second coordinate system C2. In the free mode, the coordinate system turning regulation part 324 does not regulate the turning of the second coordinate system C2. This provides greater flexibility to the needs of the operator.

The operation device 300 may further include the calibration part 351 and the unsetting notification part 352. Based on an input into the operation input part 311, the calibration part 351 sets the posture of the second coordinate system C2 relative to the first coordinate system C1 at a preset initial posture. When the initial posture has not been set by the calibration part 351, the unsetting notification part 352 notifies that the initial posture has not been set. This ensures a manipulability that is more reliably adapted to the sense of orientation of the operator.

The operation device 300 may further include the posture calculation part 322. When the coordinate system turning part 323 regulates the turning of the second coordinate system C2 about one axis, the posture calculation part 322 calculates, based on information detected by the device posture detection part 321, the turning angle of the operation input part 311 about an axis perpendicular to the one axis. The command generation part 330 may determine the motion scalar quantity included in the motion command based on the turning angle of the operation input part 311 about the axis perpendicular to the one axis. This ensures that the information of the posture of the operation input part 311 is effectively utilized. Thus, this configuration is effective for a further improvement of manipulability associated with teaching of robots.

While in the above-described embodiment a single circuit is used to perform the functional modules of the controller 200, this configuration is not intended in a limiting sense; it is also possible to use a plurality of circuits to perform the respective functional modules of the controller 200. While in the above-described embodiment a single circuit is used to perform the functional modules of the operation device 300, this configuration is not intended in a limiting sense; it is also possible to use a plurality of circuits to perform the respective functional modules of the operation device 300.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. An operation device, comprising:
   operation input circuitry configured to receive instructions for operating a robot comprising a leading end and a multi-articular arm configured to change a position and a posture of the leading end;
   a device posture sensor configured to detect a posture of the operation input circuitry in a first coordinate system for controlling the robot; and
   processing circuitry configured to rotate a second coordinate system rotatable relative to the first coordinate system based on the posture of the operation input circuitry, generate a motion command for the leading end of the robot in the second coordinate system based on an input operation into the operation input circuitry, convert the motion command into a first-coordinate-system motion command for the leading end of the robot in the first coordinate system, output the first-coordinate-system motion command for controlling the robot based on the first-coordinate-system motion command, and regulate a rotation of the second coordinate system around at least one axis.

2. The operation device according to claim 1, wherein the processing circuitry is further configured to regulate the rotation of the second coordinate system around an axis perpendicular to a reference axis that is along one direction while allowing the rotation of the second coordinate system around the reference axis.

3. The operation device according to claim 2, wherein the reference axis comprises a vertical axis.

4. The operation device according to claim 2, wherein the processing circuitry is configured to output screen data of an operation screen to be displayed on the operation input circuitry, the operation screen includes a first movement tool image by which a first command for moving the leading end of the robot along the reference axis is input, and a second movement tool image by which a second command for moving the leading end of the robot along a surface perpendicular to the reference axis is input, and the processing circuitry is configured to further generate the motion command for the leading end of the robot in the second coordinate system based on a first operation input on the first movement tool image, and further generate the motion command for the leading end of the robot in the second coordinate system based on a second operation input on the second movement tool image.

5. The operation device according to claim 4, wherein upon execution of a first point operation of specifying at least one point on the first movement tool image, the processing circuitry is further configured to determine, based on a position of the specified at least one point on the first movement tool image, a first movement direction in which the leading end of the robot moves along the reference axis, and upon execution of a second point operation of specifying at least one point on the second movement tool image, the processing circuitry is further configured to determine, based on a position of the specified at least one point on the second movement tool image, a second movement direction in which the leading end of the robot moves along the surface perpendicular to the reference axis.

6. The operation device according to claim 5, wherein the first movement tool image includes a one-dimensional operation system that is drawn along a line and that corresponds to a movement line set along the reference axis in the second coordinate system, the second movement tool image includes a plurality of one-dimensional operation systems that are respectively drawn along a plurality of lines crossing each other and that respectively correspond to a plurality of movement lines crossing each other on the surface perpendicular to the reference axis in the second coordinate system, upon the execution of the first point operation of specifying at least one first point in the one-dimensional operation system of the first movement tool image, the processing circuitry is further configured to determine, based on a position of the specified at least one first point in the one-dimensional operation system, the first movement direction on the movement line corresponding to the one-dimensional operation system, and upon the execution of the second point operation of specifying at least one second point in one one-dimensional operation system among the plurality of one-dimensional operation systems of the second movement tool image, the processing circuitry is further configured to determine, based on a position of the specified at least one second point in the one one-dimensional operation system, the second movement direction on one movement line, among the plurality of movement lines, that corresponds to the one one-dimensional operation system.

7. The operation device according to claim 4, wherein the operation screen further includes a quantity setting tool image on which a scalar quantity included in the motion command is specified, and the processing circuitry is configured to determine the scalar quantity based on an input via the quantity setting tool image.

8. The operation device according to claim 4, wherein the operation screen further includes a rotation tool image by which a third command for rotating the leading end of the robot is input, and the processing circuitry is further configured to generate, based on the third command input via the rotation tool image, a rotation command for the leading end of the robot in the second coordinate system.

9. The operation device according to claim 4, wherein the multi-articular arm includes a plurality of joints, and the processing circuitry is further configured to output the screen data of the operation screen to be displayed on the operation input circuitry such that the operation screen further includes an angle indicator indicating a combination of an angle status and an angle limit of each of the plurality of joints.

10. The operation device according to claim 4, wherein the processing circuitry is further configured to switch between a regulation mode in which the processing circuitry regulates the rotation of the second coordinate system, and a free mode in which the processing circuitry does not regulate the rotation of the second coordinate system.

11. The operation device according to claim 1, wherein the processing circuitry is further configured to set a posture of the second coordinate system relative to the first coordinate system at a preset initial posture based on an input into the operation input circuitry, and notify that the initial posture has not yet been set when the initial posture has not been set by the processing circuitry.

12. The operation device according to claim 1, the processing circuitry is further configured to calculate a rotation angle of the operation input circuitry around an axis perpendicular to the at least one axis based on information detected by the device posture sensor when the circuitry regulates the rotation of the second coordinate system around the at least one axis, and determine a scalar quantity included in the motion command based on the rotation angle of the operation input circuitry around the axis perpendicular to the at least one axis.

13. A control system, comprising:
an operation device comprising operation input circuitry configured to operate a robot comprising a leading end and a multi-articular arm configured to change a position and a posture of the leading end, a device posture sensor configured to detect a posture of the operation input circuitry in a first coordinate system for controlling the robot, and processing circuitry configured to rotate a second coordinate system rotatable relative to the first coordinate system based on the posture of the operation input circuitry, generate a motion command for the leading end of the robot in the second coordinate system based on an input operation into the operation input circuitry, convert the motion command into a first-coordinate-system motion command for the leading end of the robot in the first coordinate system, output the first-coordinate-system motion command for controlling the robot based on the first-coordinate-system motion command, and regulate a rotation of the second coordinate system around at least one axis; and
control circuitry configured to control the robot to move the leading end of the robot using the multi-articular arm based on the first-coordinate-system motion command.

14. A control method for operation input circuitry configured to operate a robot comprising a leading end and a multi-articular arm configured to change a position and a posture of the leading end, the control method comprising:
detecting a posture of the operation input circuitry in a first coordinate system that is for controlling the robot;
based on the posture of the operation input circuitry, rotating a second coordinate system rotatable relative to the first coordinate system;
based on an operation input into the operation input circuitry, generating a motion command for the leading end of the robot in the second coordinate system;
converting the motion command into a first-coordinate-system motion command for the leading end of the robot in the first coordinate system;
outputting the first-coordinate-system motion command for controlling the robot based on the first-coordinate-system motion command; and
regulating a rotation of the second coordinate system around at least one axis.

15. A non-transitory computer-readable storage medium storing a program for causing operation input circuitry configured to operate a robot to perform a control method according to claim 14, the robot including a leading end and a multi-articular arm configured to change a position and a posture of the leading end.

16. The operation device according to claim 3, wherein the processing circuitry is further configured to output screen data of an operation screen to be displayed on the operation input circuitry, the operation screen includes a first movement tool image by which a first command for moving the leading end of the robot along the reference axis is input, and a second movement tool image by which a second command for moving the leading end of the robot along a surface perpendicular to the reference axis is input, and the processing circuitry is configured to further generate the motion command for the leading end of the robot in the second coordinate system based on a first operation input on the first movement tool image, and further generate the motion command for the leading end of the robot in the second coordinate system based on a second operation input on the second movement tool image.

17. The operation device according to claim 16, wherein upon execution of a first point operation of specifying at least one point on the first movement tool image, the processing circuitry is further configured to determine, based on a position of the specified at least one point on the first movement tool image, a first movement direction in which the leading end of the robot moves along the reference axis, and upon execution of a second point operation of specifying at least one point on the second movement tool image, the processing circuitry is further configured to determine, based on a position of the specified at least one point on the second movement tool image, a second movement direction in which the leading end of the robot moves along the surface perpendicular to the reference axis.

18. The operation device according to claim 17, wherein the first movement tool image includes a one-dimensional operation system that is drawn along a line and that corresponds to a movement line set along the reference axis in the second coordinate system, the second movement tool image includes a plurality of one-dimensional operation systems that are respectively drawn along a plurality of lines crossing each other and that respectively correspond to a plurality of movement lines crossing each other on the surface perpendicular to the reference axis in the second coordinate system, upon the execution of the first point operation of specifying at least one first point in the one-dimensional operation system of the first movement tool image, the processing circuitry is further configured to determine, based on a position of the specified at least one first point in the one-dimensional operation system, the first movement direction on the movement line corresponding to the one-dimensional operation system, and upon the execution of the second point operation of specifying at least one second point in one one-dimensional operation system among the plurality of one-dimensional operation systems of the second movement tool image, the processing circuitry is further configured to determine, based on a position of the specified at least one second point in the one one-dimensional operation system, the second movement direction on one movement line, among the plurality of movement lines, that corresponds to the one one-dimensional operation system.

19. The operation device according to claim 5, wherein the operation screen further includes a quantity setting tool image on which a scalar quantity included in the motion command is specified, and the processing circuitry is configured to determine the scalar quantity based on an input via the quantity setting tool image.

20. The operation device according to claim 6, wherein the operation screen further includes a quantity setting tool image on which a scalar quantity included in the motion command is specified, and the processing circuitry is configured to determine the scalar quantity based on an input via the quantity setting tool image.

* * * * *